(12) United States Patent
Tadokoro et al.

(10) Patent No.: US 6,359,707 B1
(45) Date of Patent: Mar. 19, 2002

(54) COMMUNICATION APPARATUS WHICH OUTPUTS COMMUNICATION STATUS DATA IN PLURAL DIFFERENT COLORS

(75) Inventors: Yoshihisa Tadokoro, Yokohama; Kazuhiro Uruma, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/744,277

(22) Filed: Nov. 6, 1996

Related U.S. Application Data

(63) Continuation of application No. 08/440,466, filed on May 12, 1995, now abandoned, which is a continuation of application No. 07/811,287, filed on Dec. 20, 1991, now abandoned.

(30) Foreign Application Priority Data

| Dec. 26, 1990 | (JP) | ............................................. 2-414471 |
| Mar. 14, 1991 | (JP) | ............................................. 3-074663 |
| Apr. 24, 1991 | (JP) | ............................................. 3-094383 |
| May 23, 1991 | (JP) | ............................................. 3-118327 |

(51) Int. Cl.⁷ ............................................................. H04N 1/56
(52) U.S. Cl. ........................ 358/500; 358/504; 358/405; 358/439
(58) Field of Search ................................. 358/500, 501, 358/504, 403, 404, 405, 437, 440, 468, 439; 382/162; H04N 1/56

(56) References Cited

U.S. PATENT DOCUMENTS

| 4,313,124 A | | 1/1982 | Hara ........................ 346/140 R |
| 4,345,262 A | | 8/1982 | Shirato et al. ........... 346/140 R |
| 4,459,600 A | | 7/1984 | Sato et al. ............... 346/140 R |
| 4,463,359 A | | 7/1984 | Ayata et al. .................. 346/1.1 |
| 4,558,333 A | | 12/1985 | Sugitani et al. ......... 346/140 R |
| 4,723,129 A | | 2/1988 | Endo et al. .................... 346/1.1 |
| 4,740,796 A | | 4/1988 | Endo et al. .................... 346/1.1 |
| 4,862,254 A | | 8/1989 | Takada ........................ 358/75 |
| 5,023,728 A | * | 6/1991 | Nimura et al. .............. 358/437 |
| 5,065,254 A | * | 11/1991 | Hishida ....................... 358/440 |
| 5,128,748 A | * | 7/1992 | Murakami et al. ........... 358/500 |
| 5,130,818 A | * | 7/1992 | Tadokoro ..................... 358/402 |
| 5,153,744 A | * | 10/1992 | Nobuta ........................ 358/400 |
| 5,220,417 A | * | 6/1993 | Sugiura ....................... 358/434 |
| 5,251,020 A | * | 10/1993 | Sugiyama ................... 358/500 |
| 5,262,851 A | * | 11/1993 | Nakatani et al. ............ 358/500 |
| 5,267,303 A | * | 11/1993 | Johnson et al. .............. 379/100 |
| 5,483,631 A | * | 1/1996 | Nagai et al. | |

FOREIGN PATENT DOCUMENTS

| EP | 367231 | 5/1990 |
| JP | 59123670 | 7/1984 |
| JP | 59138461 | 8/1984 |
| JP | 1-128664 | 5/1989 |
| JP | 1-264363 | 10/1989 |
| JP | 2-302143 | * 12/1990 |
| JP | 2-305266 | 12/1990 |
| JP | 4-270548 | * 9/1992 |

* cited by examiner

Primary Examiner—Kimberly A. Williams
(74) Attorney, Agent, or Firm—Fitzpatrick, Cella, Harper & Scinto

(57) ABSTRACT

A color communication apparatus includes a communication device for communicating color data, a color output device capable of outputting a plurality of colors, a generator for generating communication status data, and a controller for outputting the communication status data at least one of the plurality of colors, the color being selected based on the contents of the communication status data.

67 Claims, 23 Drawing Sheets

FIG. 2

**\* \* \* \* \* \* \* \* \* \* \* \***
**\* COMMUNICATION \***
**\* CONTROL REPORT \***
**\* \* \* \* \* \* \* \* \* \* \* \***

| COMMUNI-CATION MODE | COLOR/ BLACK-AND-WHITE | TELEPHONE NUMBER OF COMMUNICATION PARTNER<br>ABBREVIATED NAME OF COMMUNICATION PARTNER (TERMINAL ID)<br>START TIME | SUBADDRESS<br>COMMUNI-CATION TIME | TARIFF | COMMUNI-CATION RESULT |
|---|---|---|---|---|---|
| STORAGE TRANS-MISSION | COLOR | 0354827234<br>081-0354827234=CANON<br>90-12-21 15:12 | 124<br>00:00:30 | ¥ 10 | OK |
| STORAGE RECEPTION | BLACK-AND-WHITE | 0459114899<br>081-0459114899=META<br>90-12-21 16:12 | ABSENT<br>00:05:45 | ¥ 30 | OK |
| STORAGE TRANS-MISSION | COLOR | 0354339234<br>081-0354339234=ISDNKEN<br>90-12-22 08:12 | 023<br>00:15:25 | ¥ 60 | NG |
| DIRECT TRANS-MISSION | COLOR | 0888839234<br>081-0888839234=HANSHA<br>90-12-22 09:47 | ABSENT<br>00:09:34 | ¥ 350 | OK |
| (F1) | (F2) | (F3)<br>(F4)<br>(F6) | (F5)<br>(F7) | (F8) | (F9) |

FIG. 9

| | F11 | F12 | F13 | F14 |
|---|---|---|---|---|
| | NO. | COLOR | ABBREVIATED NAME | PASS WORD |
| | 0 | BLACK | COMMON | ABSENT |
| | 1 | RED | KOIZUMI KYOKO | 1 2 1 2 |
| | 2 | BLUE | JINNAI TAKANORI | 7 7 7 7 |
| | 3 | GREEN | HONDA RISA | 4 5 8 9 |
| | 4 | PURPLE | KUDO SHIZUKA | 1 3 7 9 |

FIG. 10

```
              CONFIDENTIAL DOCUMENT
                RECEPTION REPORT
CONFIDENTIAL BOX NUMBER : 04

ABBREVIATED NAME           : KUDO SHIZUKA

DATE                       : JUNE 11, 1990

ADDRESS OF
COMMUNICATION PARTNER      : 5758-2111

TERMINAL ID OF
COMMUNICATION PARTNER      : 081-0357582111 = MIHO

ABBREVIATED NAME OF
COMMUNICATION PARTNER      : NAKAYAMA MIHO

NUMBER OF SHEETS           : 5 SHEETS

TARIFF                     : 20 YEN
```

```
F21  1990. 6. 11. 19:45
F22  CONFIDENTIAL DOCUMENT RECEIVED          BOX NUMBER :
F23  COLOR       : IN TRANSMISSION    P002
     BLACK-AND-  : IN RECEPTION       P003
     WHITE
```

FORMAT OF CALL IDENTIFICATION LINE

| F41 | | F42 | | F43 | | F44 |
|---|---|---|---|---|---|---|
| IDENTIFIER OF USER'S OWN TERMINAL | | IDENTIFIER OF COMMUNICATION PARTNER'S TERMINAL | | DATE AND TIME | | DOCUMENT NUMBER AND NUMBER OF PAGES |
| 24 CHAR | 1 | 24 CHAR | 1 | 14 CHAR | 1 | 7 CHAR |
| 72 CHAR ||||||||

FIG. 17

COLOR INFORMATION TABLE

| F51 IDENTIFIER OF COMMUNICATION PARTNER'S TERMINAL | F52 COLOR INFORMATION |
|---|---|
| 012-012345678 = ABCD | RED |
| | BLUE |
| | GREEN |
| | |

FIG. 21

| SUBSCRIBER'S NUMBER PORTION | SUBADDRESS |
|---|---|

FIG. 22

| SUBADDRESS | COLOR INFORMATION |
|---|---|
| 000 | BLUE |
| 001 | RED |
| 002 | YELLOW |
| 003 | GREEN |
| ⋮ | ⋮ |

COMMUNICATION APPARATUS WHICH OUTPUTS COMMUNICATION STATUS DATA IN PLURAL DIFFERENT COLORS

This application is a continuation of Application Ser. No. 08/440,466, filed May 12, 1995, now abandoned, which was a continuation of Application Ser. No. 07/811,287, filed Dec. 20, 1991, now abandoned.

BACKGROUND OF THE INVENTION

1. Field of the Invention

This invention relates to a color communication apparatus capable of communicating color data.

2. Description of the Prior Art

In general, a communication apparatus, such as a facsimile apparatus or the like, is mostly used in a company, a school or the like, and is shared in many cases by a plurality of people, departments or the like.

A commonly used facsimile apparatus prints received image information and various kinds of reports indicating communication results or the like only in black.

Recently, a demand for color printing has increased in the field of communication apparatus, such as facsimile apparatus or the like, as well as in the field of copiers.

Accordingly, the provision of color facsimile apparatus has been desired. However, a color facsimile apparatus which prints various kinds of reports in black as a conventional black-and-white facsimile apparatus does not effectively utilize a color printing function. Furthermore, if a communication control report including a plurality of communication results is printed only in black, it is difficult to determine each of the communication results.

Moreover, if a confidential document is received in such a facsimile apparatus, a confidential document reception report is always printed in the same color, and a confidential document reception message is always displayed on an operation panel in the same color.

The above-described conventional approach has a disadvantage in that it is impossible to know to whom a confidential document is sent unless a confidential box number printed on a confidential box report or displayed on the operation panel is seen.

In some of conventional facsimile apparatuses, such as G3 machines or G4 class-1 machines, a call identification line for a received document is printed. That is, in such a facsimile apparatus, a call identification line including the abbreviated name and telephone number of a transmitter is printed at the head of the received output document sheet.

In a conventional facsimile apparatus, however, a call identification line is always printed in black. Hence, the conventional approach has a disadvantage in that it is difficult to understand at a glance from where a received document comes unless the contents of the call identification line are read.

As described above, a communication facsimile apparatus as the disadvantage that information relating to a received document, a report on communication results or the like cannot be understood at a glance.

SUMMARY OF THE INVENTION

It is an object of the present invention to provide a color communication apparatus which solves the above-described problems.

According to one aspect of the present invention, a communication status can be grasped at a glance by printing a communication control report at a communication terminal apparatus in different colors in accordance with kinds of communication operations.

According to another aspect, the present invention relates to a color communication apparatus comprising reception means for receiving confidential documents, storage means for storing a confidential document received by the reception means in a confidential box, color registration means for registering a color for each confidential box of the storage means, and output means for outputting a confidential document reception report using a color for a confidential box of the storage means registered in the color registration means.

In the above-described configuration, by outputting (for example, printing or displaying) a confidential document reception report and a confidential document reception message in the color registered for the confidential box storing the received confidential document, it is possible to determine to whom the condifential document has been transmitted by merely seeing the color of the report and the message.

It is another object of the present invention to provide a color communication apparatus from which one can easily determine to whom data have been transmitted by merely glancing at received output paper.

This object is accomplished, according to another aspect of the present invention, by a color communication apparatus comprising registration means for registering color information preset corresponding to identifying information, such as a subaddress or the like, received from a network, such as an ISDN (integrated services digital network) or the like, selection means for selecting color information registered in the registration means according to identifying information received from the network when image information is received, and printing control means for printing transmitter's information in the received image information according to the selected color information as header information or the like.

It is still another object of the present invention to provide a color communication apparatus from which one can identify a communication partner by merely glancing the color of a call identification line of a at received document.

This object is accomplished, according to another aspect of the present invention, by a color communication apparatus in which a color information table corresponding to a communication partner's terminal is included color information from the color information table according to an identifier of the communication partner's terminal transmitted from the communication partner's terminal is selected and a call identification line in a color corresponding to the color information is printed.

The foregoing and other objects and features of the present invention will become more apparent from the following detailed description of the preferred embodiments taken in connection with the accompanying drawings.

BRIEF DESCRIPTION OF THE DRAWINGS

FIG. 2 is a diagram illustrating a format of a communication control report according to the embodiment;

FIG. 9 is a diagram showing the configuration of a color information table for respective confidential box numbers in the embodiment;

FIG. 10 is a diagram illustrating a format of a confidential document reception report in the embodiment;

FIG. 11 is a diagram illustrating a format of message display on a display device 9 shown in FIG. 1, in the embodiment;

FIG. 16 is a schematic diagram showing the format of a call identification line advised by the CCITT used in a second embodiment of the present invention;

FIG. 17 is a schematic diagram showing a table of color information corresponding to identifiers of communication partners' terminals used in the second embodiment;

FIG. 21 is a schematic diagram showing part of the ISDN's numbering system used in the third embodiment;

FIG. 22 is a schematic diagram showing a correspondence table of subaddresses and color information used in the third embodiment;

DETAILED DESCRIPTION OF THE PREFERRED EMBODIMENTS

Figure 1:
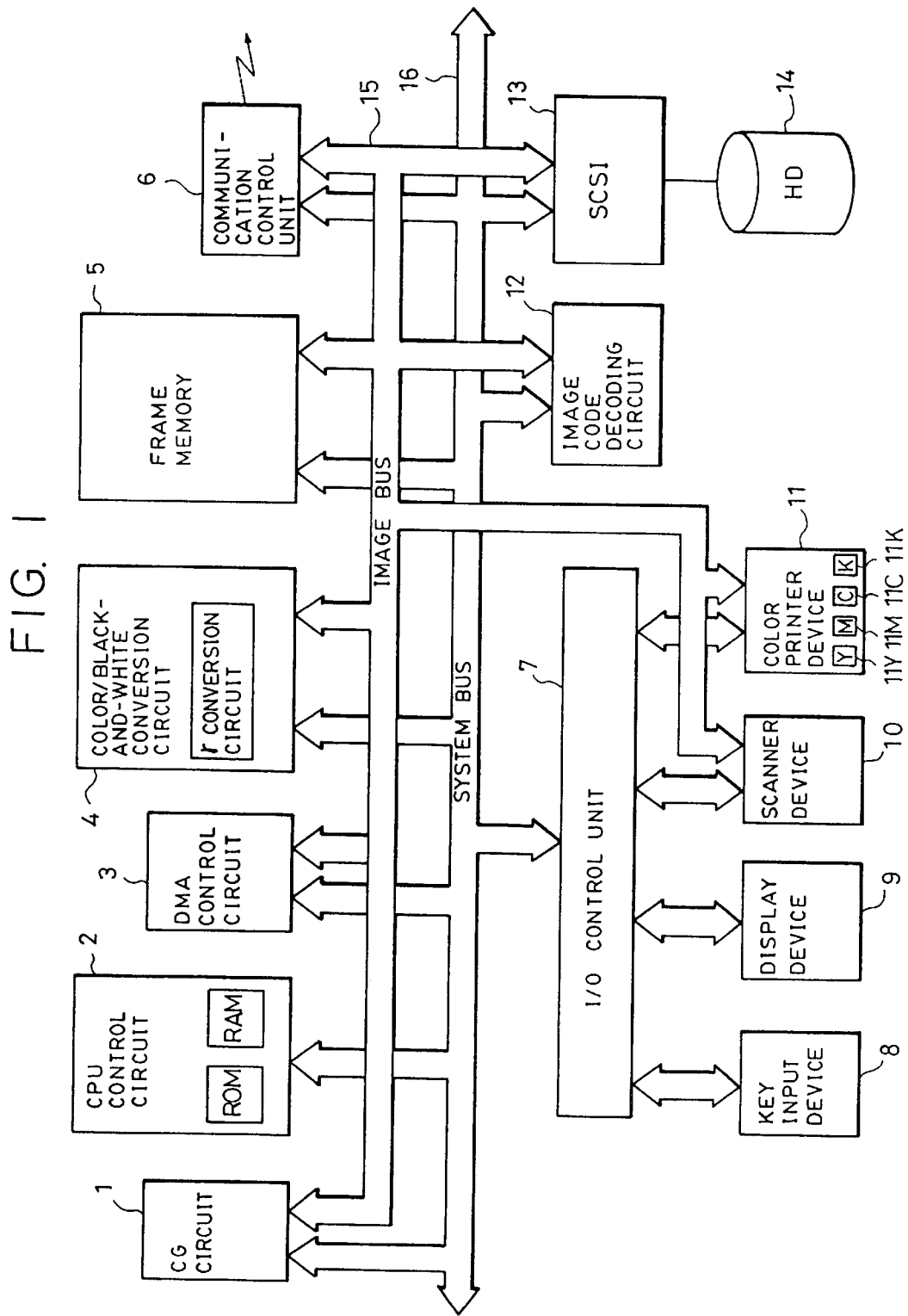
FIG. 1 is a block diagram showing the configuration of a color facsimile apparatus, serving as a communication apparatus, according to an embodiment of the present invention.

FIG. 1 is a diagram showing the configuration of a color/black-and-white facsimile apparatus, serving as a communication apparatus, according to an embodiment of the present invention.

In FIG. 1, a CG (character generator) circuit 1 generates characters to be printed on a report, a received document or the like in accordance with built-in or received character codes. A CPU (central processing unit) control circuit 2 includes a ROM (read-only memory) and a RAM (random access memory), and controls the entire system. A DMA (direct memory access) control circuit 3 transfers image data between memories not via a CPU. A color/black-and-white conversion circuit 4 includes a color conversion circuit for converting a CMYK (cyan, magenta, yellow and black) image into an RGB (red, green and blue) image and vice versa, a conversion circuit for converting a color image into a black-and-white image, a γ conversion circuit for converting a characteristic of a multivalue image data, and a conversion circuit for converting a multivalue image into a binary image, and the like, and performs various kinds of conversion. A frame memory 5 stores image data in a case where image data of more than one page are developed for every block. A communication control unit 6 controls call/called status with a communication partner's terminal and transmission/reception of image data using a communication protocol. An I/O control unit 7 controls a key input device 8, a display device 9, a scanner device 10 and a printer device 11. The key input device 8 receives an instruction by a key input (for example, a one-touch key, ten keys, a start button or a stop button) from the user. The display device 9 displays a message on an LCD (liquid crystal display), and notifies the user of various kinds of information (for example, no room in the memory, no paper, ink exhausted, and a communication status) by lighting and turning off LEDs (light-emitting diodes). The scanner device 10 reads an original in an assigned mode (for example, the paper size, characters/a photograph, or density). The color printer device 11 outputs color/black-and-white image data and character data on paper, and includes respective recording heads 11C, 11M, 11Y and 11K for cyan, magenta, yellow and black. An image code decoding circuit 12 performs compression/expansion of color/black-and white image data. An SCSI (small computer system interface) 13 functions as an interface with hard disks. A nonvolatile memory 14 is represented by hard disks. An image bus 15 is used for image data. A system bus 16 controls the entire system. Ink-jet recording, thermal transfer recording, electrophotographic recording or the like may be suitably used for a color recording means. Particularly, ink-jet recording is suitable for the present invention since there is little difference in printing time between color and black-and-white printing.

FIG. 2 illustrates a format of a communication control (or status) report. In FIG. 2, F1 represents an area indicating communication modes, such as storage transmission, direct reception and the like. F2 represents an area indicating color/black-and-white. F3 represents an area indicating subscribers' numbers (telephone numbers) of communication partners. F4 represents an area indicating information of terminal identifiers (abbreviated names of communication partners) to be exchanged in session layers on the communication protocol. F5 represents an area indicating received subaddresses. F6 represents an area indicating dates and times of the start of communication operations. F7 represents an area indicating times needed for communication operations. F8 represents an area indicating tariff information for communication operations. F9 represents an area indicating communication results (OK or NG). Each set of F1–F9 provides a communication log.

Figure 3:
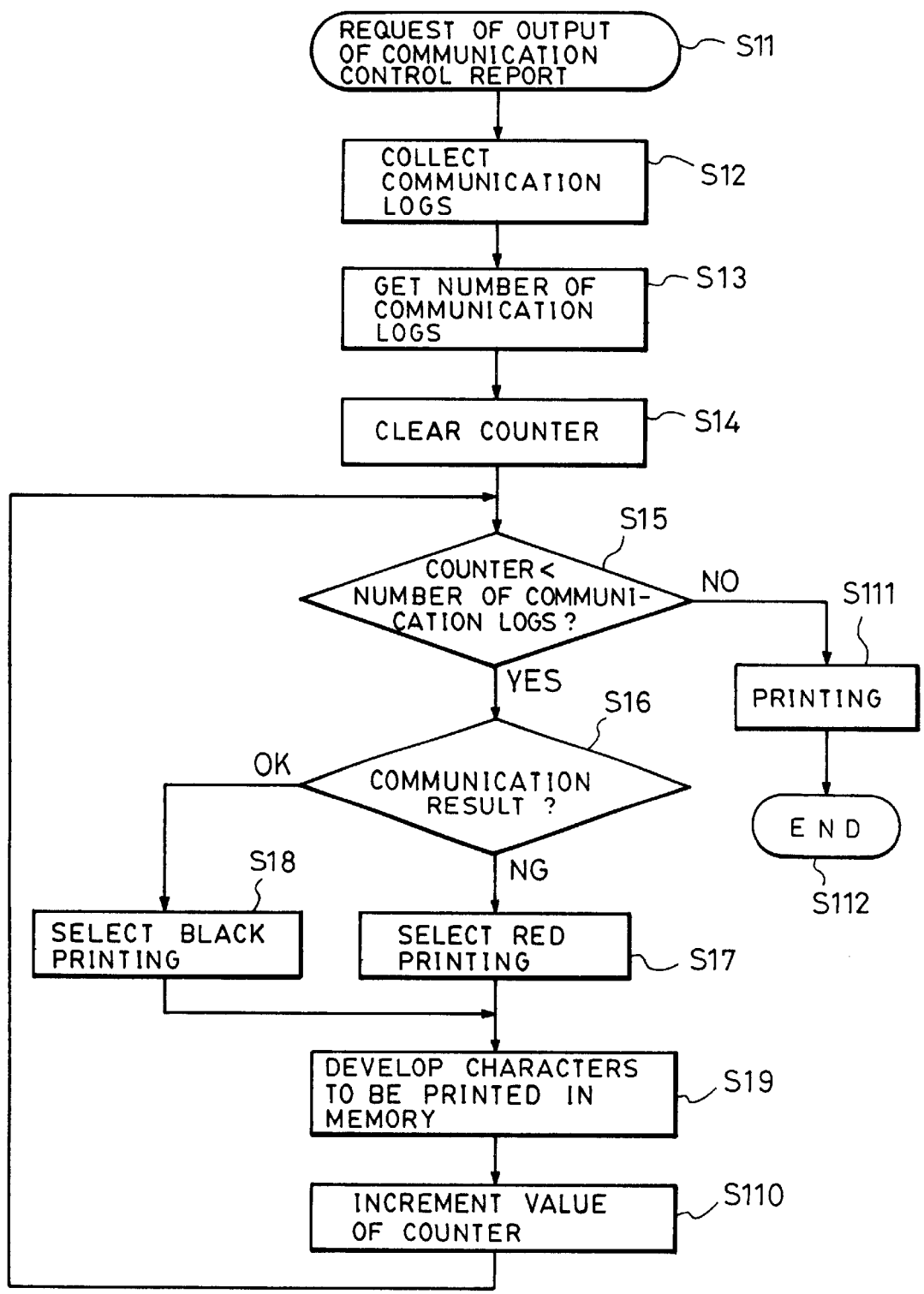
FIG. 3 is a flowchart showing an operation of the embodiment.

FIG. 3 is a flowchart of an output sequence of a communication control report wherein black printing is performed for a normal communication operation and red printing is performed for an abnormal communication operation in the present embodiment.

First, if a request of an output of a communication control report from the user is present in step S11, the process proceeds to step S12, where communication log information stored in the hard disks 14 shown in FIG. 1 is collected. The process then proceeds to step S13, where the number of the collected communication logs is obtained. The process then proceeds to step S14, where a counter for communication logs is cleared for initialization. The process then proceeds to step S15, where the counter and the number of the communication logs are compared with each other. If the number of the communication logs is greater than the counter, the process proceeds to step S16, where the communication result in the contents of the communication logs is determined. If the communication result is NG (failed), the process proceeds to step S17, where the print color of the communication logs is assigned to be red, and the process proceeds to step S19. If the communication result is OK in step S16, the process proceeds to step S18, where the print color of the communication logs is assigned to be black, and the process proceeds to step S19. In step S19, characters to be output are developed in the RAM of the CPU control unit 2, and the process proceeds to step S110. In step S110, the value of the counter is incremented by one, and the process proceeds to step S15. Until the counter reaches the number of the communication logs, steps S15 through S110 are repeatedly carried out. If the number of the communication logs is not greater than the counter in step S15, the process proceeds to step S111. In step S111, printing data of the communication logs developed in the RAM of the CPU control unit 2 are output to the color printer device 11 via the CG circuit 1 to print the communication control report for all the communication logs, and the process proceeds to step S112, where the process is terminated.

Figure 4:
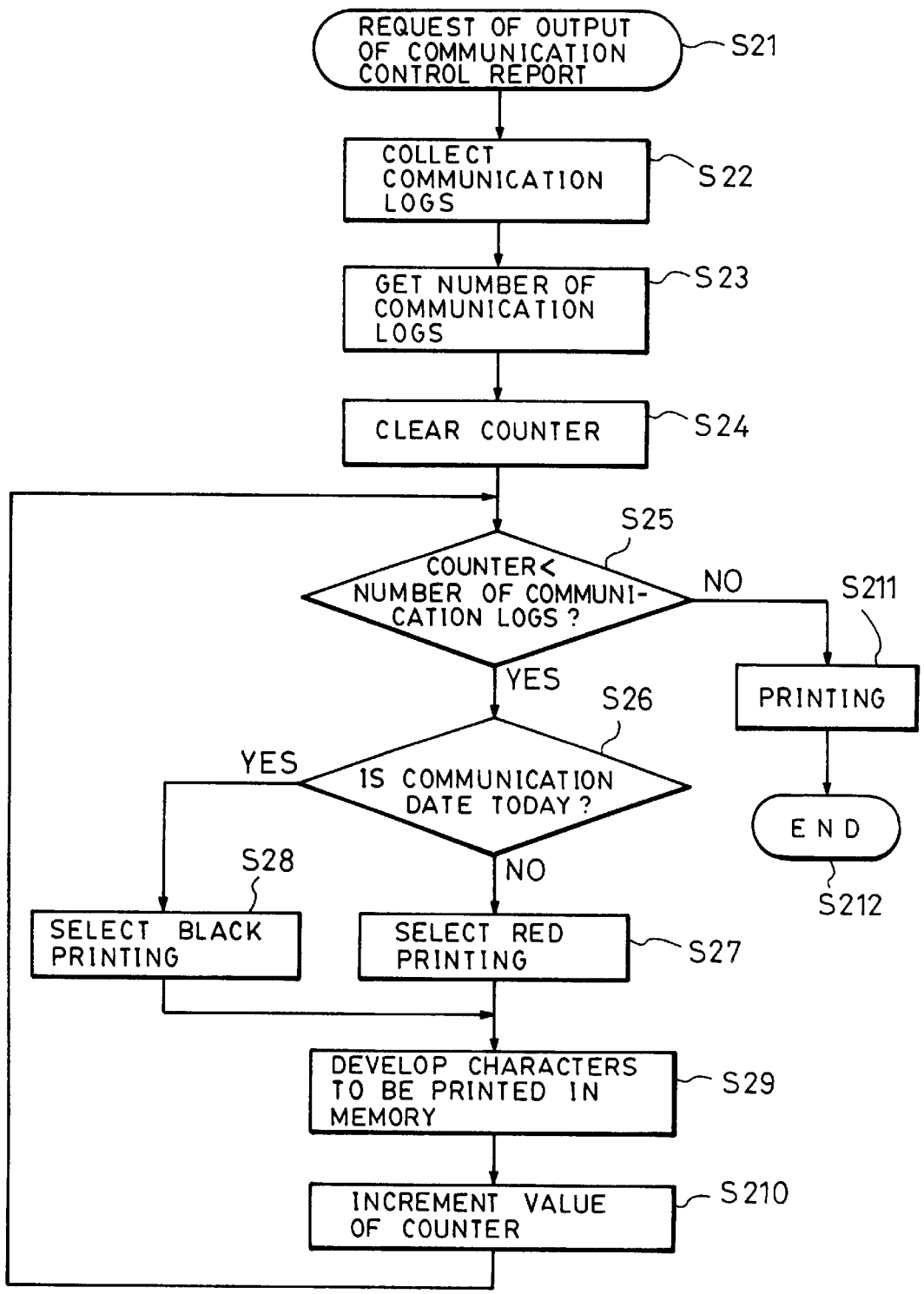
FIG. 4 is a flowchart showing another operation of the embodiment.

FIG. 4 is a flowchart of an output sequence of a communication control report wherein red printing is performed if communication times are from the current date of the report and black printing is performed in other cases.

First, if a request of an output of a communication control report from the user is present in step S21, the process proceeds to step S22, where communication log information stored in the hard disks 14 shown in FIG. 1 is collected. The process then proceeds to step S23, where the number of the collected communication logs is obtained. The process then proceeds to step S24, where a counter for communication logs is cleared for initialization. The process then proceeds to step S25, where the counter and the number of the communication logs are compared with each other. If the number of the communication logs is greater than the counter, the process proceeds to step S26, where date information in the contents of the communication logs is determined. If the communication time is from today, the process proceeds to step S27, where the print color of the communication logs is assigned to be red, and the process proceeds to step S29. If the communication time is not from today in step S26, the process proceeds to step S28, where the print color of the communication logs is assigned to be black, and the process proceeds to step S29. In step S29, characters to be output are developed in the RAM of the CPU control unit 2, and the process proceeds to step S210. In step S210, the value of the counter is incremented by one, and the process proceeds to step S25. Until the counter reaches the number of the communication logs, steps S25 through S210 are repeatedly carried out. If the number of the communication logs is not greater than the counter in step S25, the process proceeds to step S211. In step S211, printing data of the communication logs developed in the RAM of the CPU control unit 2 are output to the color printer device 11 via the CG circuit 1 to print the communication control report for all the communication logs, and the process proceeds to step S212, where the process is terminated.

Figure 5:
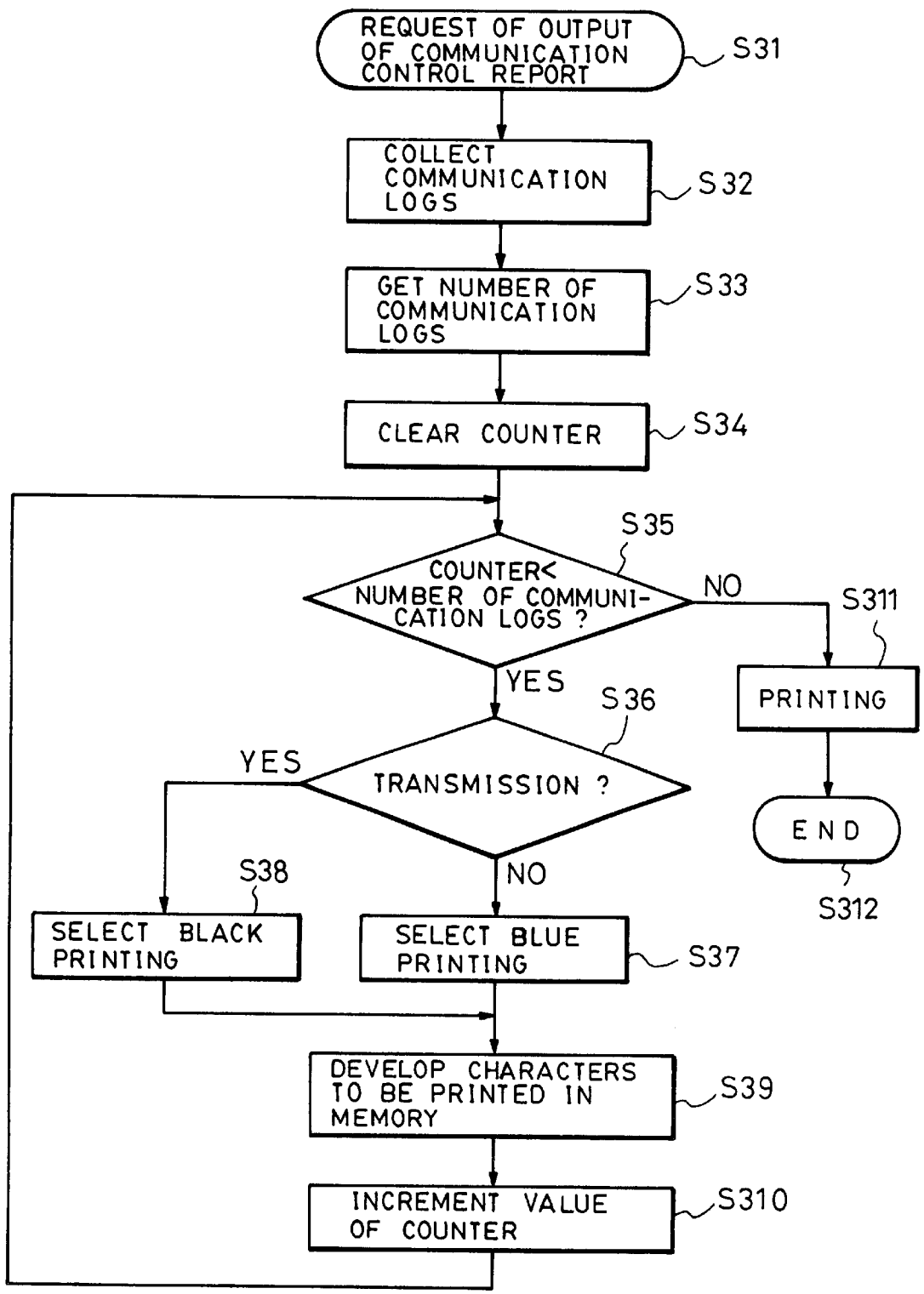
FIG. 5 is a flowchart showing still another operation of the embodiment.

FIG. 5 is a flowchart of an output sequence of a communication control report wherein black printing is performed for transmission and blue printing is performed for reception in the present embodiment.

First, if a request of an output of a communication control report from the user is present in step S31, the process proceeds to step S32, where communication log information stored in the hard disks 14 shown in FIG. 1 is collected. The process then proceeds to step S33, where the number of the collected communication logs is obtained. The process then proceeds to step S34, where a counter for communication logs is cleared for intialization. The process then proceeds to step S35, where the counter and the number of the communication logs are compared with each other. If the number of the communication logs is greater than the counter, the process proceeds to step S36, where transmission/reception of a communication mode in the contents of the communication logs is determined. If the communication mode is reception, the process proceeds to step S37, where the print color of the communication logs is assigned to be blue, and the process proceeds to step S39. If the communication mode is transmission in step S36, the process proceeds to step S38, where the print color of the communication logs is assigned to be black, and the process proceeds to step S39. In step S39, characters to be output are developed in the RAM of the CPU control unit 2, and the process proceeds to step S310. In step S310, the value of the counter is incremented by one, and the process proceeds to step S35. Until the counter reaches the number of the communication logs, steps S35 through S310 are repeatedly carried out. If the number of the communication logs is not greater than the counter in step S35, the process proceeds to step S311. In step S311, printing data of the communication logs developed in the RAM of the CPU control unit 2 are output to the color printer device 11 via the CG circuit 1 to print the communication control report for all the communication logs, and the process proceeds to step S312, where the process is terminated.

Figure 6:
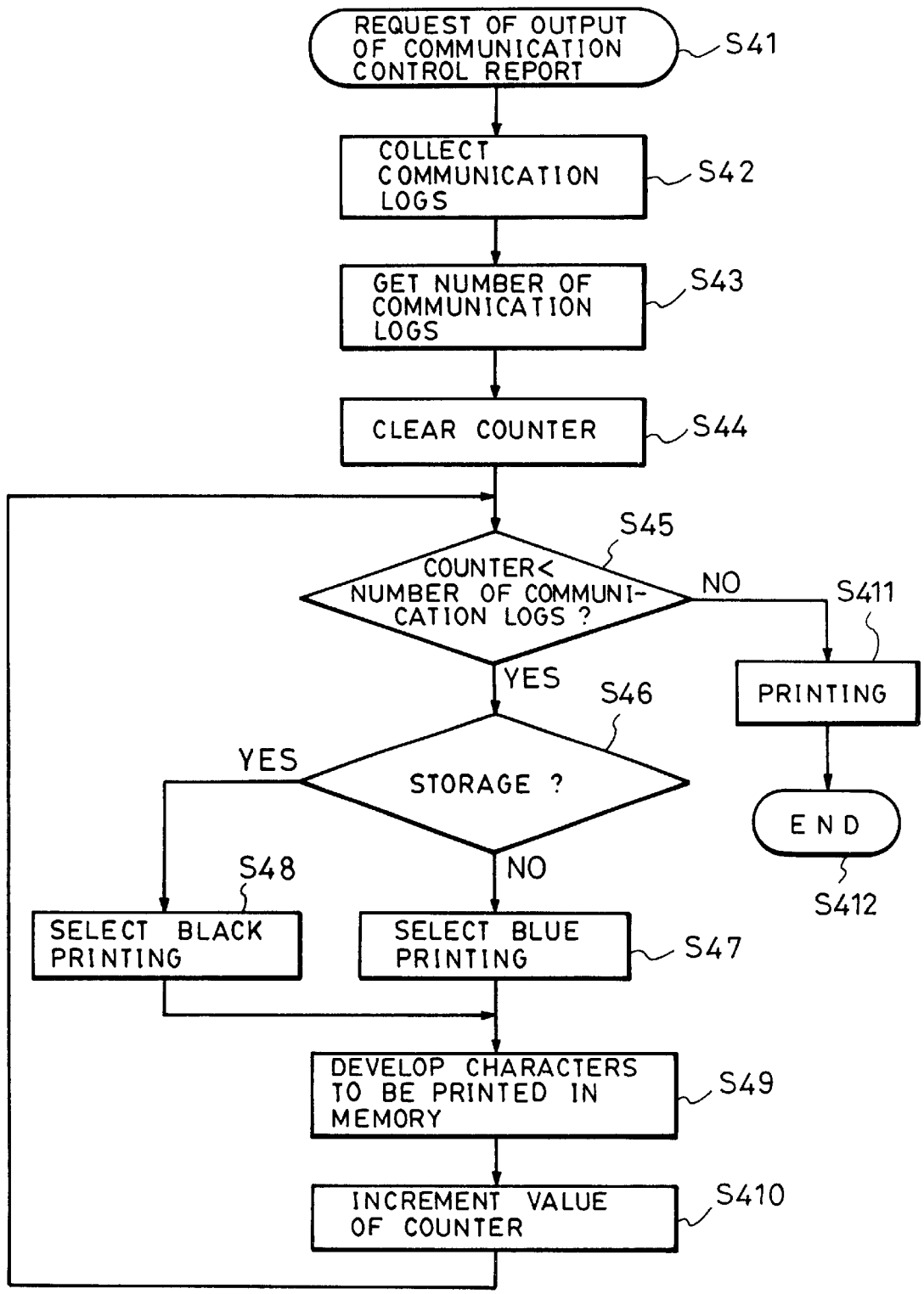
FIG. 6 is a flowchart showing still another operation of the embodiment.

FIG. 6 is a flowchart of an output sequence of a communication control report wherein black printing is performed for storage transmission/reception (storage communication) and blue printing is performed for direct transmission/reception (direct communication) in the present embodiment.

First, if a request of an output of a communication control report from the user is present in step S41, the process proceeds to step S42, where communication log information stored in the hard disks 14 shown in FIG. 1 is collected. The process then proceeds to step S43, where the number of the collected communication logs is obtained. The process then proceeds to step S44, where a counter for communication logs is cleared for initialization. The process then proceeds to step S45, where the counter and the number of the communication logs are compared with each other. If the number of the communication logs is greater than the counter, the process proceeds to step S46, where storage communication/direct communication of a communication mode in the contents of the communication logs is determined. If the communication mode is direct communication, the process proceeds to step S47, where the print color of the communication logs is assigned to be blue, and the process proceeds to step S49. If the communication mode is storage communication in step S46, the process proceeds to step S48, where the print color of the communication logs is assigned to be black, and the process proceeds to step S49. In step S49, characters to be output are developed in the RAM of the CPU control unit 2, and the process proceeds to step S410. In step S410, the value of the counter is incremented by one, and the process proceeds to step S45. Until the counter reaches the number of the communication logs, steps S46 through S410 are repeatedly carried out. If the number of the communication logs is not greater than the counter in step S45, the process proceeds to step S411. In step S411, printing data of the communication logs developed in the RAM of the CPU control unit 2 are output to the color printer device 11 via the CG circuit 1 to print the communication control report, and the process proceeds to step S412, where the process is terminated.

Figure 7:
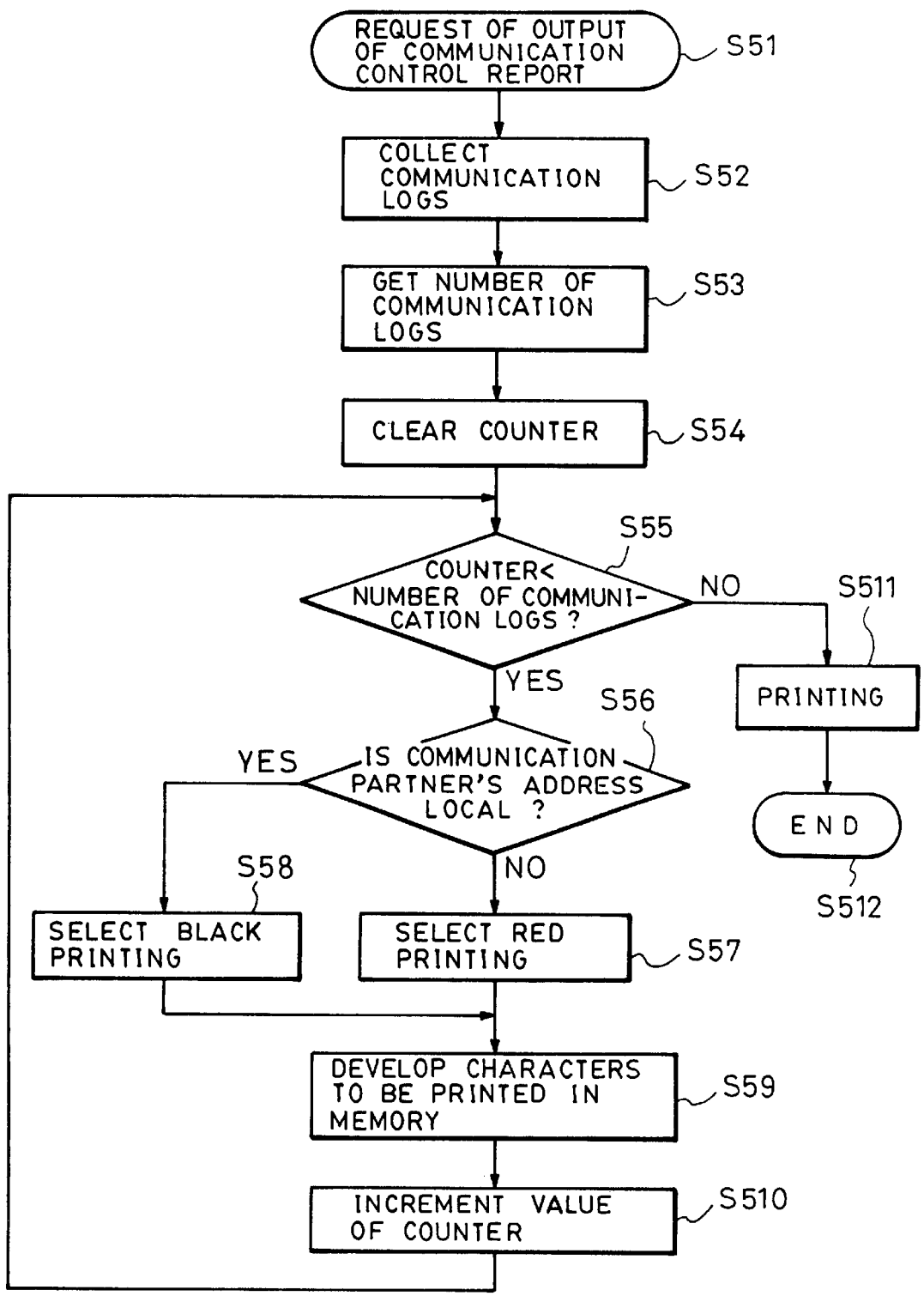
FIG. 7 is a flowchart showing still another operation of the embodiment.

FIG. 7 is a flowchart of an output sequence of a communication control report wherein black printing is performed if the address of the communication partner belongs, for example, to the same city as that of the user, that is, in the case of a local call, and red printing is performed in the case of a long distance call in the present embodiment.

First, if a request of an output of a communication control report from the user is present in step S51, the process proceeds to step S52, where communication log information stored in the hard disks 14 shown in FIG. 1 is collected. The process then proceeds to step S53, where the number of the collected communication logs is obtained. The process then proceeds to step S54, where a counter for communication logs is cleared for initialization. The process then proceeds to step S55, where the counter and the number of the communication logs are compared with each other. If the number of the communication logs is greater than the counter, the process proceeds to step S56, where the communication partner's address in the contents of the communication logs is determined. If the address does not belong to the same city, the process proceeds to step S57, where the print color of the communication logs is assigned to be red, and the process proceeds to step S59. If the address belongs to the same city in step S56, the process proceeds to step S58, where the print color of the communication logs is assigned to be black, and the process proceeds to step S59. In step S59, characters to be output are developed in the RAM of the CPU control unit 2, and the process proceeds to step S510. In step S510, the value of the counter is incremented by one, and the process proceeds to step S55. Until the counter reaches the number of the communication logs, steps S55 through S510 are repeatedly carried out. If the number of the communication logs is not greater than the counter in step S55, the process proceeds to step S511. In step S511, printing data of the communication logs developed in the RAM of the CPU control unit 2 are output to the color printer device 11 via the CG circuit 1 to print the communication control report, and the process proceeds to step S512, where the process is terminated.

Although, in the foregoing explanation, colors are assigned for all the communication log information printing areas F1–F9 for one communication operation, colors may be assigned for part of the areas. For example, a print color may be changed only for area F9 for printing NG if the result is NG.

Print colors are not limited to the above-described black, red and blue, but any other colors, such as green, orange and the like, may also be used.

FIGS. 3, 4, 5, 6 and 7 show cases wherein black printing is performed if the communication result is OK and red printing is performed if the communication result is NG, wherein red printing is performed if the communication time is from the current day's date and black printing is performed if the communication time is not from the current day's date wherein black printing is performed for transmission and blue printing is performed for reception, wherein black printing is performed for storage communication and blue printing is performed for direct communication, and wherein black printing is performed for a local call and red printing is performed for a long distance call, respectively. However, a communication control report may also be printed with a combination of some or all of the above-described conditions.

For example, black printing may be performed for transmission and blue printing may be performed for reception, and red printing may be performed irrespective of transmission and reception if the communication result is NG. Alternatively, red printing may be performed for failed transmission, and orange printing may be performed for failed reception.

Figure 8:
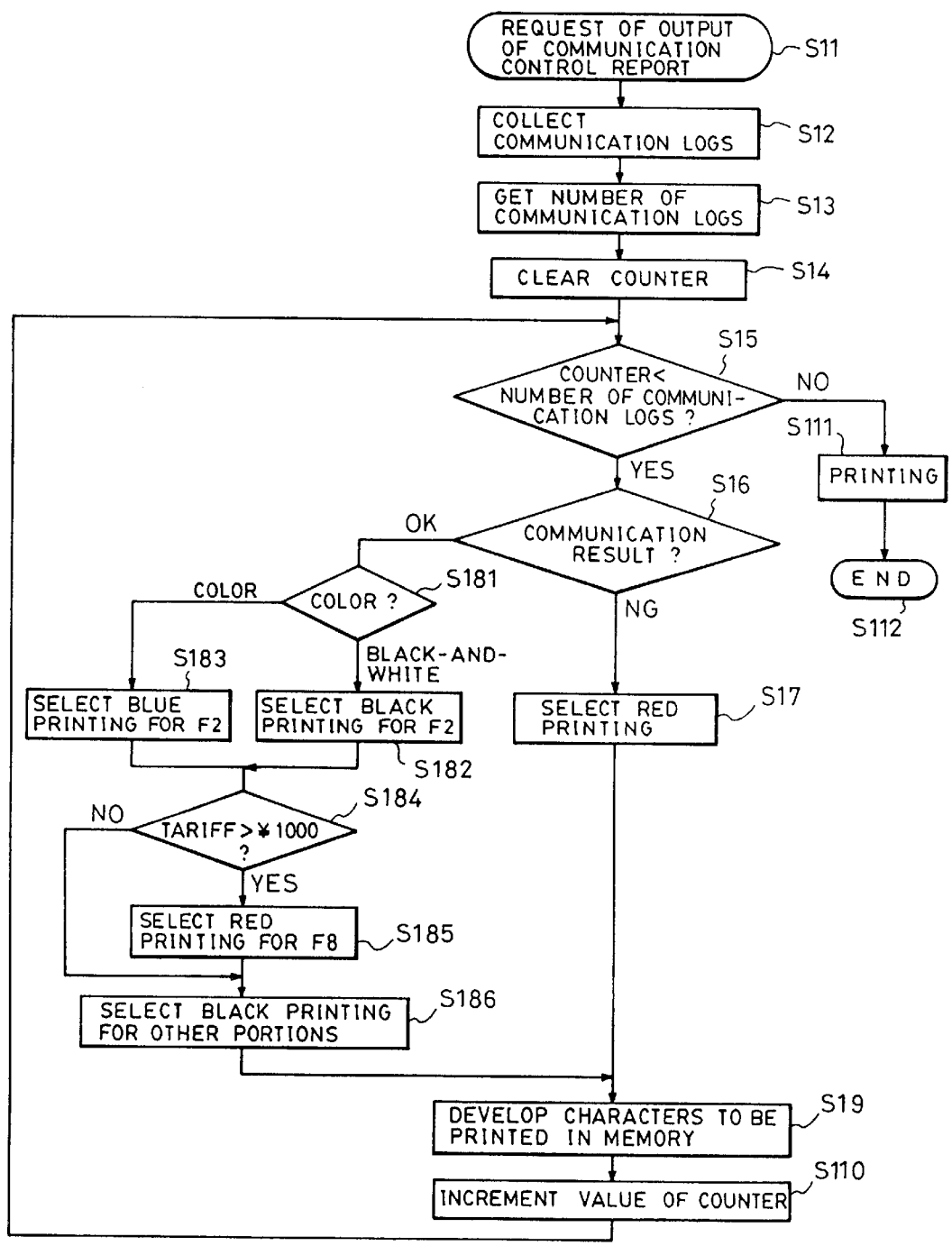
FIG. 8 is a flowchart showing still another operation of the embodiment.

FIG. 8 illustrates another approach, where red printing is performed if the communication result is NG as in the case shown in FIG. 3. In FIG. 8, in the case of color communication (S181), only area F2 indicating color/black-and-white is printed in blue (S183). If the communication tariff is high, for example, more than 1000 yen (about 8 dollars), area F8 indicating the tariff is printed in red, and other portions are printed in black. According to such a configuration, it is possible to determine color/black-and-white, high/low of the tariff, and OK/NG of the communication result utilizing the feature of a color fascimile apparatus.

An explanation will now be provided of a case wherein the present invention is applied to a confidential document reception report.

FIG. 9 shows the structure of a table of color information, abbreviated names and pass words for respective confidential boxes in the nonvolatile memory (hard disks) 14 shown in FIG. 1.

In FIG. 9, F11 represents a field for confidential box numbers, F12 represents a field for storing color information corresponding to the respective confidential box numbers, F13 represents a field for storing abbreviated numbers corresponding to the respective confidential box numbers, and F14 represents a field for storing pass words corresponding to the respective confidential box numbers.

FIG. 10 illustrates a format of a condifential document reception report. It is assumed that characters shown in FIG. 10 are printed in a color corresponding to the table shown in FIG. 9, in this case, purple.

FIG. 11 illustrates a display on the display device 9 for realizing the present embodiment.

In FIG. 11, F21 represents a field for displaying date information, F22 represents a field for displaying a confidential document reception message, and F23 represents a field for displaying information on the communication system as a message. Such information is displayed on an LCD display picture surface of the display device 9.

F24 represents a field for notifying the user of the paper size, resolution, color/black-and-white, an error and the like by means of turning on/off of LEDs disposed at the rear surface.

Figure 12:
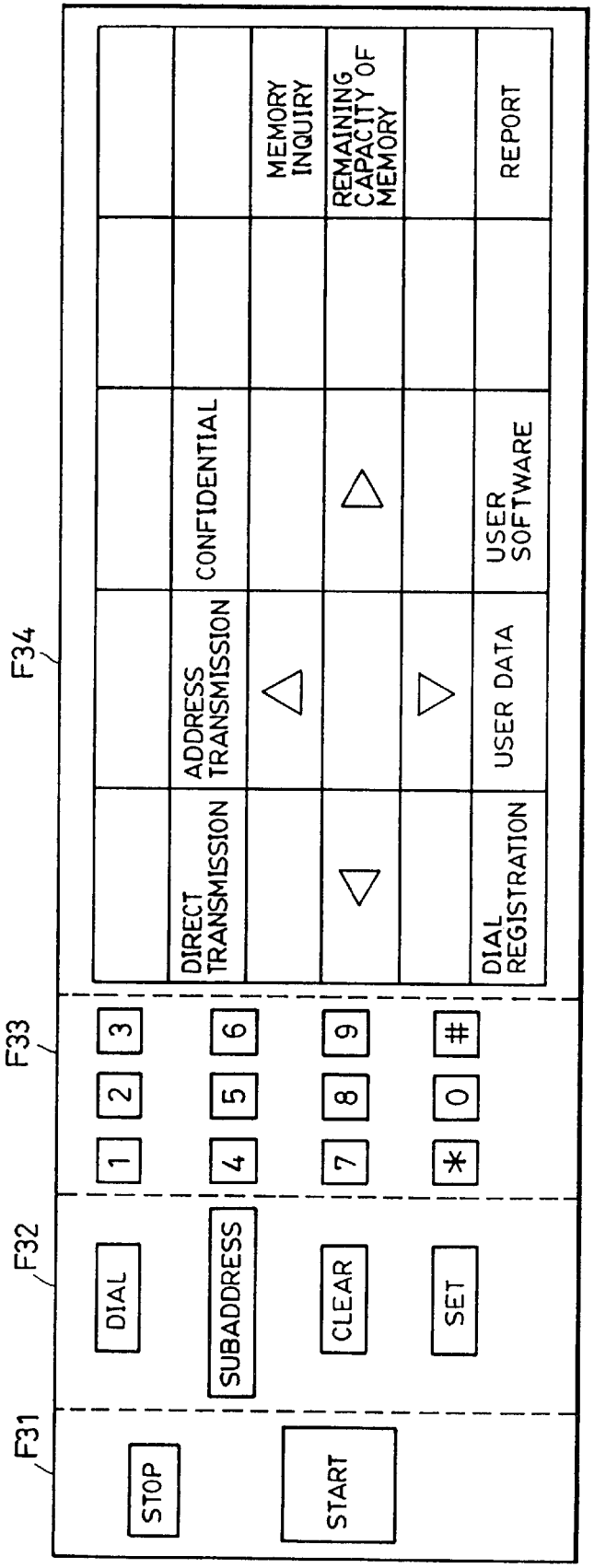
FIG. 12 is a diagram showing the detailed configuration of a key input device in the embodiment.

FIG. 12 shows an example of the structure of the key input device 8 for realizing the present embodiment.

In FIG. 12, area F31 includes a start key and a stop key for instructing the start and stop of an operation, respectively, area F32 includes a dial input mode key, a subaddress key, a clear key for clearing an input key, and a set key for setting an input, area F33 includes ten keys, and area F34 includes function keys, such as keys for assigning direct transmission, confidential document transmission, a registration function of user data, and the like.

Figure 13:
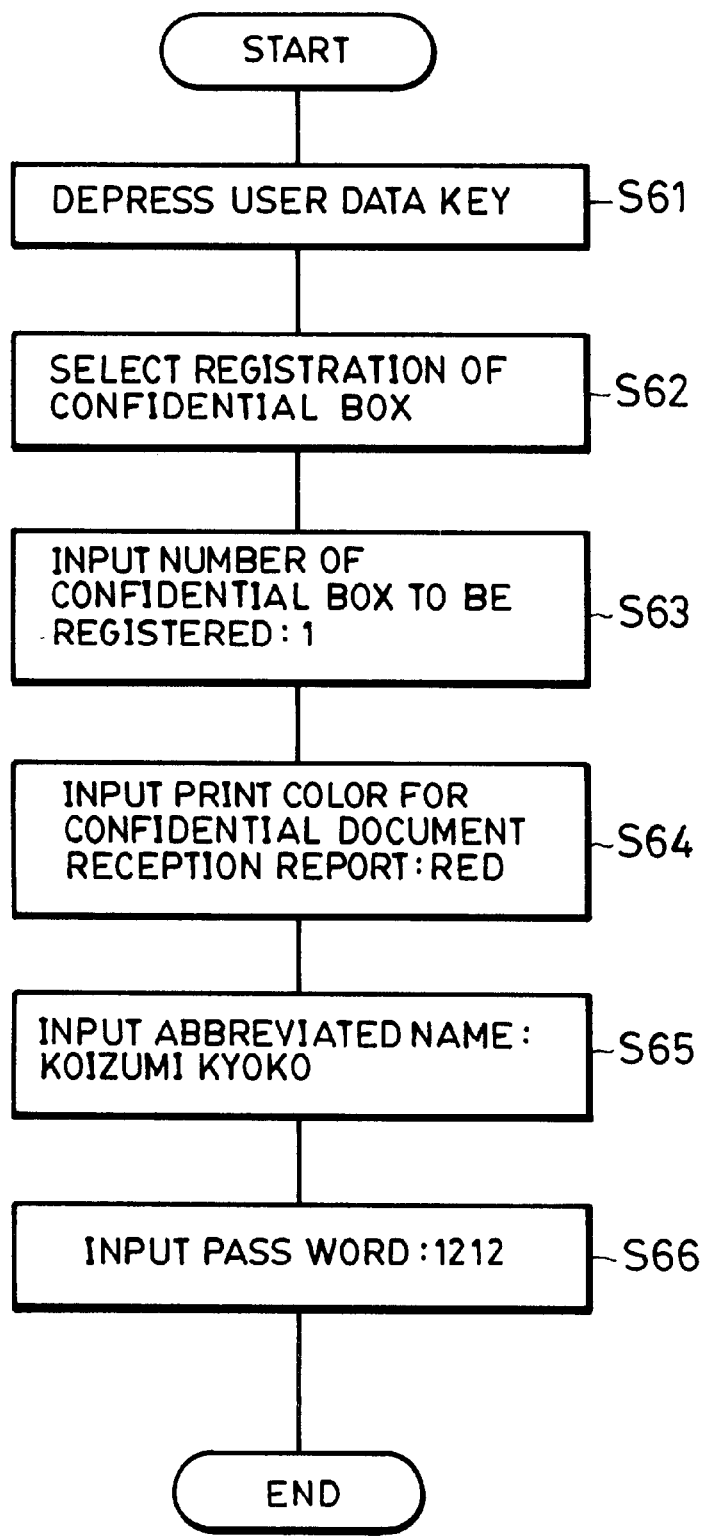
FIG. 13 is a flowchart showing color information registration processing in the embodiment.
Figure 14:
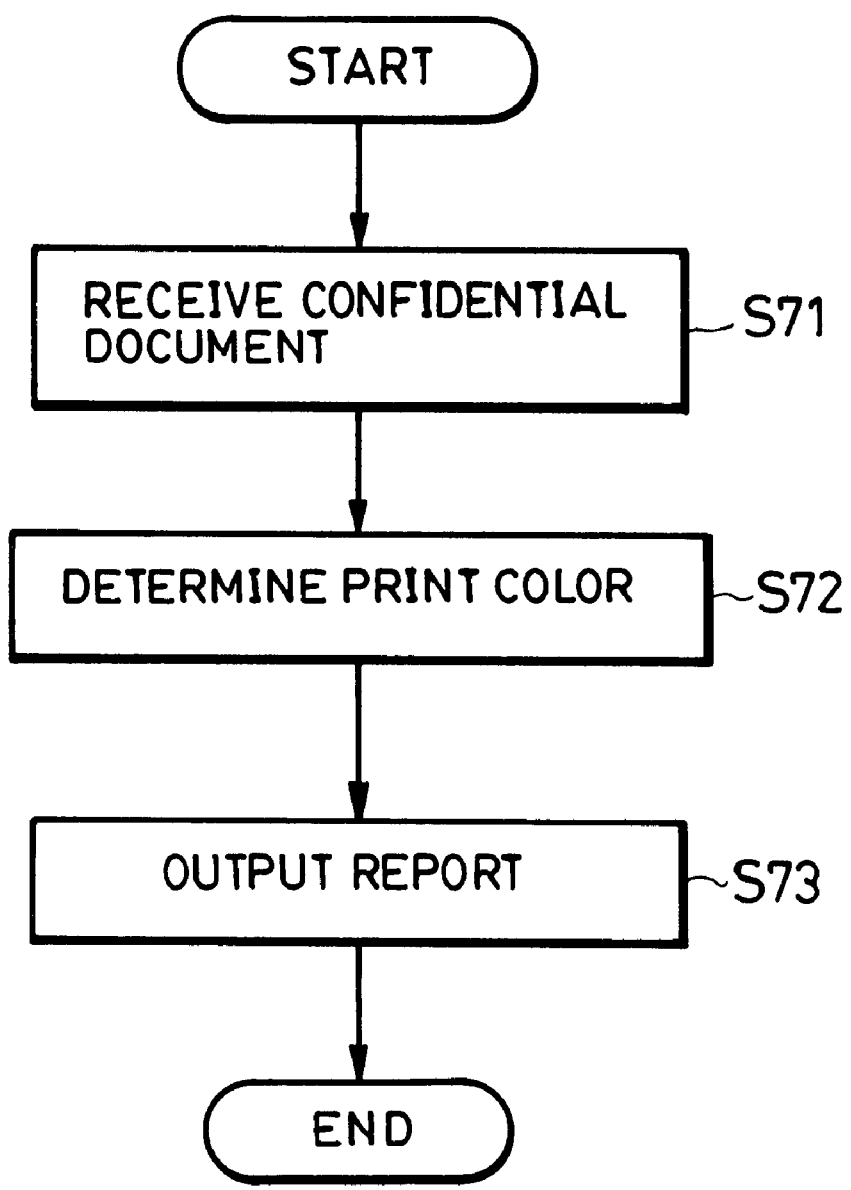
FIG. 14 is a flowchart showing processing of outputting a confidential document reception report in the embodiment.
Figure 15:
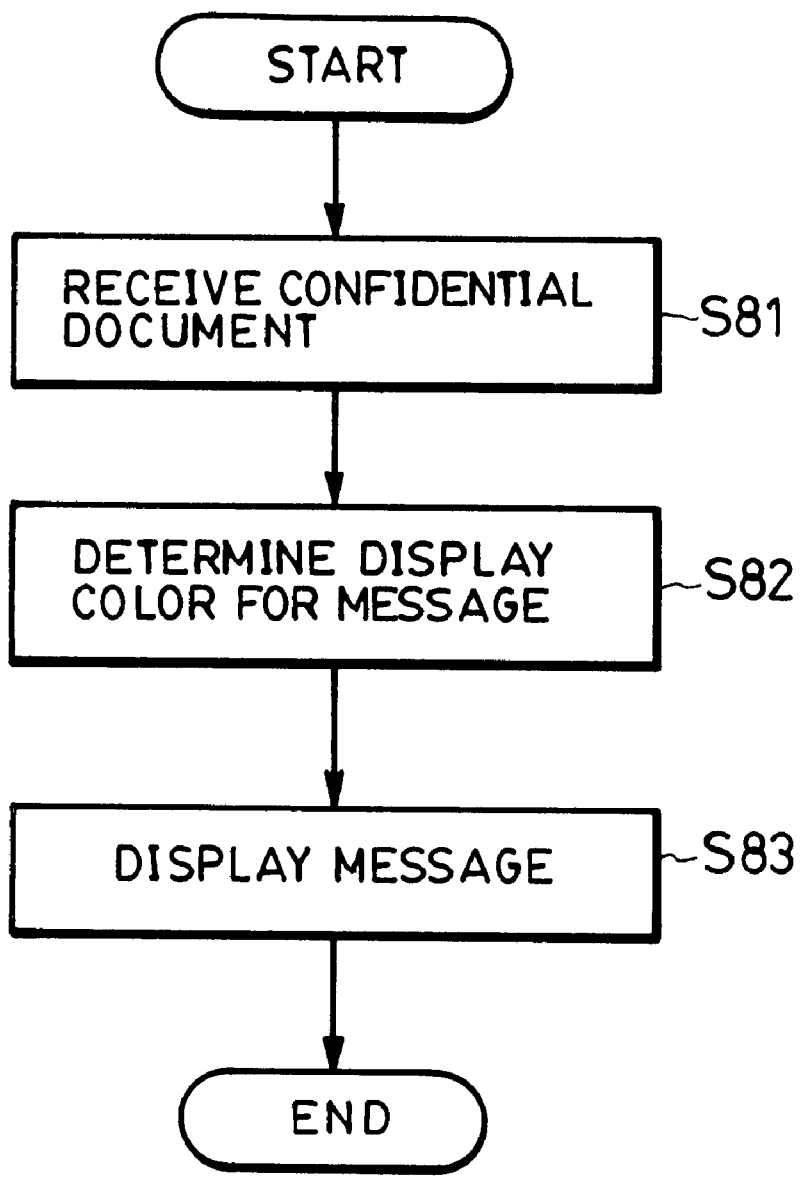
FIG. 15 is a flowchart showing processing of displaying a message in the embodiment.

An explanation will now be provided of operation control of the present embodiment in the above-described configuration with reference to flowcharts shown in FIGS. 13–15.

First, registration processing of a confidential box in the present embodiment will be explained with reference to FIG. 13 which is a flow chart showing the process of registering a confidential block in the present embodiment.

In FIG. 13, first in step S61, a user data registration mode is provided by depressing the user data key (the second from the left in the lowest row in area F34 shown in FIG. 12). In step S62, a confidential box registration mode is provided by selecting registration of a confidential box. In step S63, a confidential box number to be registered is input (for example: 1) In step S64, a color to be registered for the confidential box is input (for example: red). In step S56, an abbreviated name for determining whom the confidential box belongs to is input (example: Koizumi Kyoko). In step S66, a password to be used when the received confidential document is output is input (example: 1212). The registration processing of the confidential box is thus completed.

Next, processing of outputting a confidential document reception report in the present embodiment will be explained with reference to FIG. 14 which is a flow chart showing an output of a confidential document reception report in the present embodiment. An explanation will now be provided of a case wherein a document is received in confidential box number 4.

In step S71, the document is received in the confidential box number 4. The received document is stored in a predetermined confidential box area of the HD 14. Next, in step S72, a print color is determined. The color is determined according to the table shown in FIG. 9, for example, to be purple in the present case. Finally in step S73, the printer device 11 outputs a confidential document reception report using characters having the determined color, for example, purple. An example of the format of the actually output report is shown in FIG. 10, wherein all the characters are printed in purple. The processing of outputting the confidential document reception report is thus terminated.

Display control of a confidential document reception message in the present embodiment will now be explained with reference to FIG. 15 which is a flow chart for displaying a confidential document reception message in the present embodiment. As in the case of the processing of outputting a confidential document reception report, an explanation will be provided of a case wherein a document is received in the confidential box number 4.

In step S81, a document is received in the confidential box number 4. Subsequently, in step S82, a display color is determined. The color is determined to be purple according to the table shown in FIG. 9. Finally, in step S83, a confidential document reception message is displayed in purple. An example of the actual message is shown in F22 in FIG. 11, wherein all the characters in field F22 is purple. The processing of displaying the confidential document reception message is thus terminated.

Although, in the foregoing explanation, printing of the confidential document reception report and display of the confidential document reception message are all performed in the assigned color, the color may be assigned only for part of the report and the message, for example, the confidential box number.

The present invention may be applied to a system comprising a plurality of units, as well as to an apparatus comprising only one unit.

Furthermore, the present invention may, of course, be applied to a case wherein the above-described processing is achieved by supplying a system or an apparatus with a program.

As explained above, according to the present embodiment, by outputting confidential document reception report and message in a peculiar color registered in a confidential box number, it is possible to understand to whom a confidential document is transmitted by merely seeing the color of the report and message. Hence, the present embodiment has the effect of lessening burden on the user.

An explanation will now be provided of a second embodiment of the present invention wherein information (time of reception, the telephone number of a communication partner, and the number of pages of a received document) regarding reception is printed at the head or the tail of each page of the received document as a call identification line, which is printed in a color. In the present embodiment, the apparatus such as that shown in FIG. 1 which is capable of performing color and black-and-white communication is used.

FIG. 16 is a schematic diagram showing the format of a call identification line as currently suggested by the CCITT.

In FIG. 16, F41 represents an identifier (the telephone number) of the user's own terminal, F42 represents an identifier (the telephone number) of the communication partner's terminal, F43 represents a date and time indicating the time of transmission, and F44 represents a document number and the number of pages.

FIG. 17 is a schematic diagram showing a color information table corresponding to identifiers of communication partners' terminals.

In FIG. 17, F51 represents identifiers of communication partners' terminals in call identification lines, and F52 represents color information corresponding to the respective identifiers. This color information table is stored in the RAM of the CPU control circuit 2.

Figure 18:
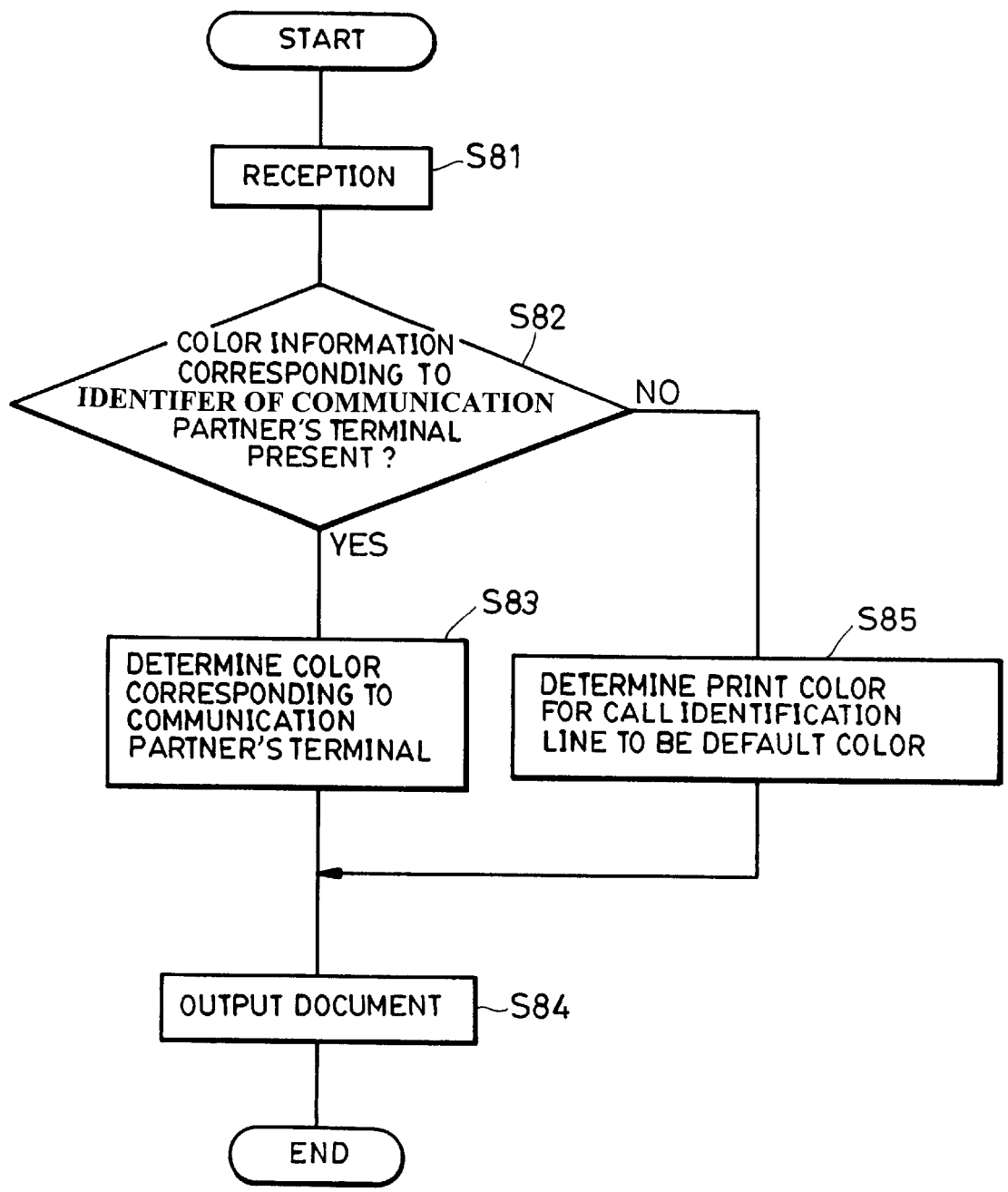
FIG. 18 is a flowchart showing a color printing operation of a call identification line in the second embodiment.

FIG. 18 is a flowchart showing the operation wherein color printing of a call identification line is performed in accordance with a terminal identifier transmitted from the communication partner's terminal.

First, the document transmitted from the communication line is transmitted to the SCSI 13 via the image bus 15 by the communication control unit 6, and is further transmitted to the hard disks 14 to be stored (S81).

Subsequently, the CPU control circuit 2 reads data of the identifier of the communication partner's terminal from the document stored in the hard disks 14 via the system bus 16 and the SCSI 13, and determines whether or not color information corresponding to the identifier of the communication partner's terminal is present according to the color information table (S82).

If color information corresponding to the identifier of the communication partner's terminal is present, the color is determined as the print color (S83). If color information corresponding to the identifier of the communication partner's terminal is absent, a default color is determined as the print color (S85).

Next, the CPU control circuit 2 determines the character font by the CG circuit 1 via the system bus 16, and transmits the determined character font to the printer device 11 via the system bus 16 and the I/O control unit 7. Subsequently, the document with the call identification line printed in the color determined in step S83 or S85 is output (S84), and the process is terminated.

Although, in the above-described embodiment, only a protocol of a G4 facsimile apparatus based on the CCITT's advice has been explained, the same processing may also be performed for a G3 facsimile apparatus.

According to the present embodiment, a call identification line can be printed in a color corresponding to the communication partner's terminal by identifying an identifier of the communication partner's terminal when an image is received. Hence, it is possible to determine from whom the document is transmitted by merely glancing at the print color of the call identification line even if the contents of the call identification line are not actually read.

Figure 19:
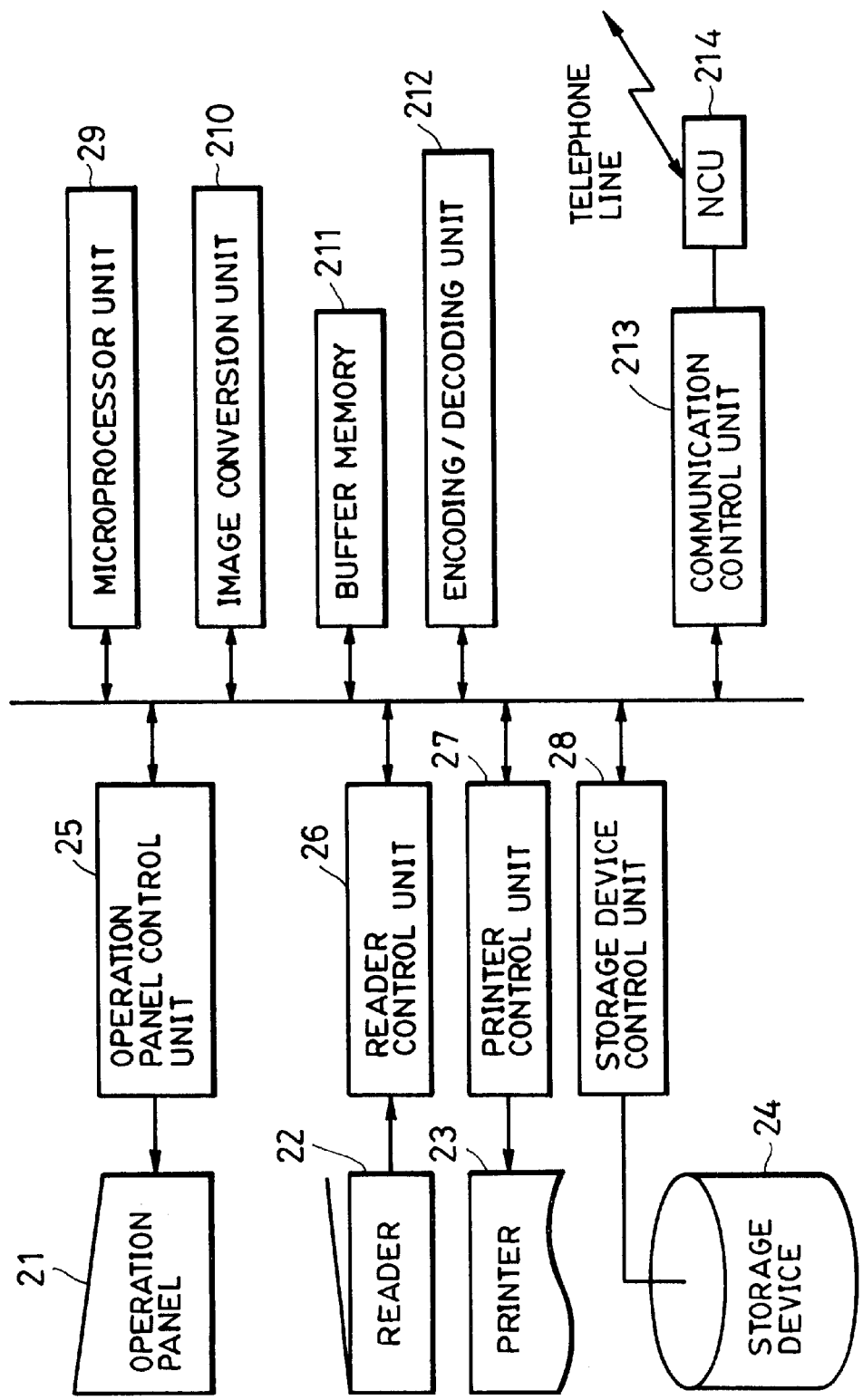
FIG. 19 is a block diagram showing the configuration of a color facsimile apparatus according to a third embodiment of the present invention.

FIG. 19 is a block diagram showing the configuration of a color facsimile apparatus according to a third embodiment of the present invention.

This color facsimile apparatus includes an operation panel 21 provided with operation keys for inputting various kinds of information and a display unit, such as an LCD or the like, a reader unit 22 for reading originals including color originals, a printer unit 23 for outputting image information including color images on recording paper, and nonvolatile storage device 24, such as hard disks or the like, for storing image information.

Control units 25–28 are provided for the operation panel 21, the reader unit 22, the printer unit 23 and the storage device 24, respectively.

The color facsimile apparatus also includes a microprocessor unit 29 for controlling the entire apparatus, an image conversion unit 210 for encoding images, a buffer memory 211 for temporarily storing image information, an encoding/decoding unit 212 for compressing and expanding image information, a communication control unit 213 for controlling communication operations of image information, and a network control unit (NCU) 214 for controlling connection with the telephone line.

The microprocessor unit 29 includes a ROM for storing various kinds of control programs, fixed data and the like, and a RAM for storing data to be used in various kinds of operations. Particularly in this embodiment, the microprocessor unit 29 selects a print color for receiver's information from a table within the RAM according to the receiver's subaddress when image information is received from the ISDN network, and performs color printing.

Figure 20:
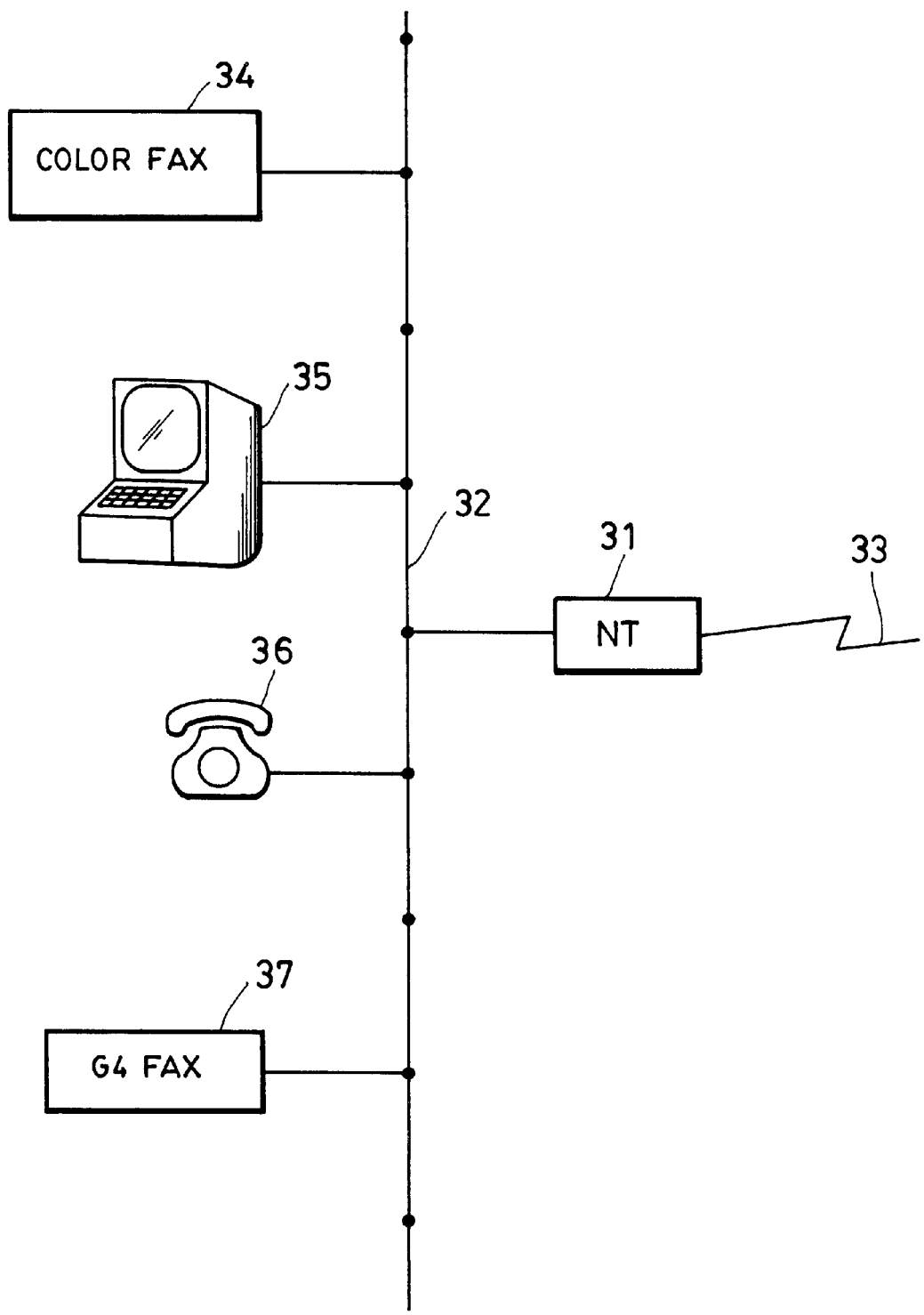
FIG. 20 is a block diagram showing the configuration of a system in the third embodiment.

FIG. 20 is a block diagram showing the system configuration in the present embodiment.

A network terminating device 31 is connected to a subscriber's line 33 of the ISDN network as network termination (NT). A color facsimile apparatus 34, a Telex device 35, a digital telephone set 36 and a G4 fascimile apparatus 37 are connected to the network terminating device 31 via a bus circuit 32.

FIG. 21 is a schematic diagram showing part of a numbering system in the ISDN.

As shown in FIG. 21, a subaddress is provided in addition to a subscriber's number portion as identifying information to be transmitted from the transmitter side to the receiver side. According to an arrangement between the transmitter side and the receiver side, print colors for received information corresponding to respective subaddresses are set and are stored in the table within the RAM.

FIG. 22 is a schematic diagram showing a correspondence table between subaddresses and color information.

According to this correspondence table, transmitter's information to be added to the header portion of received information is printed in the corresponding color.

Figure 23:
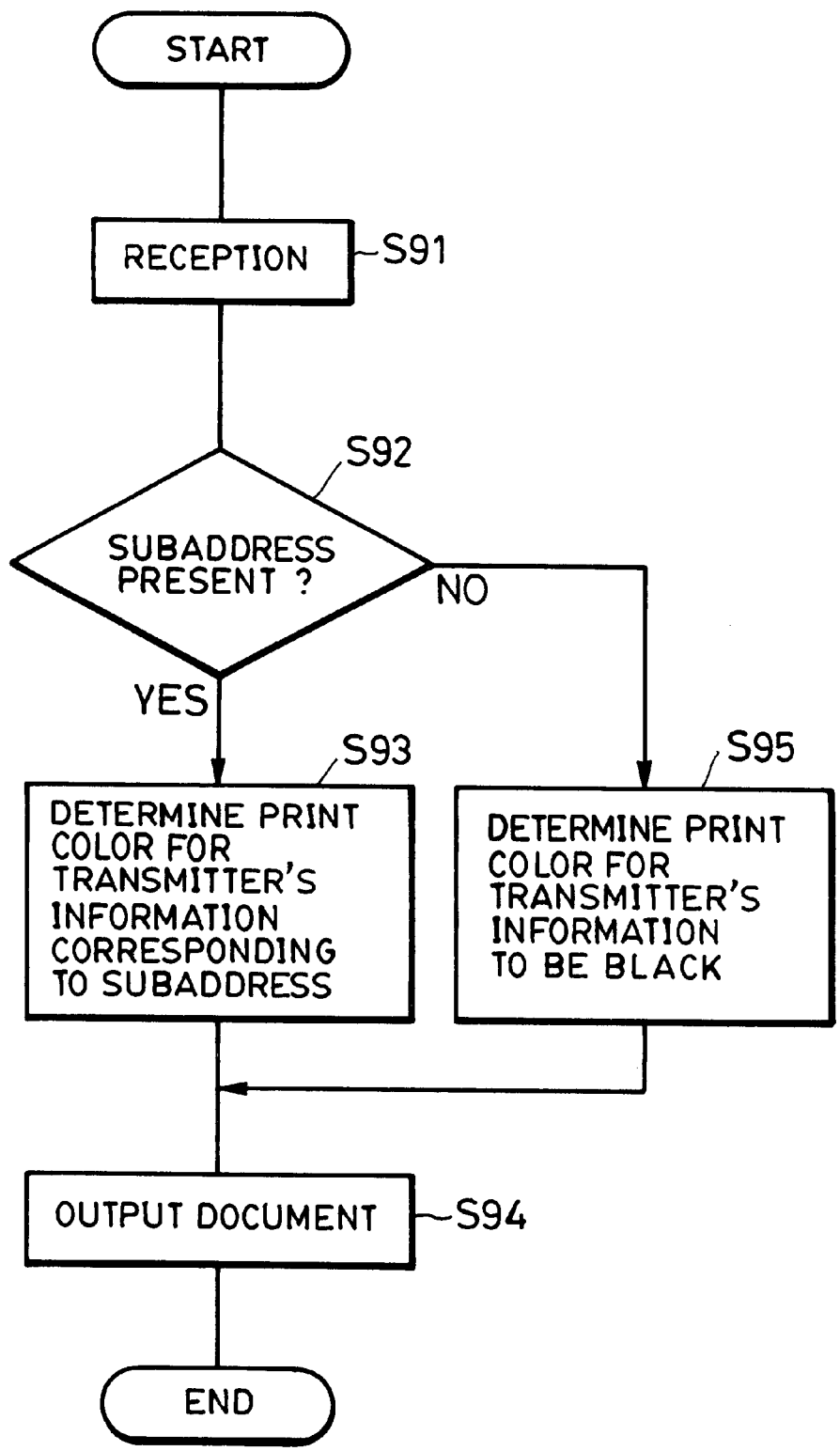
FIG. 23 is a flowchart showing a reception operation of the color facsimile apparatus in the third embodiment.

FIG. 23 is a flowchart showing a reception operation in the above-described color facsimile apparatus 43.

First, when image information is received (S91), the presence of a subaddress in the received information is determined. If the result of the determination is affirmative, the presence of the corresponding subaddress is determined by referring to the above-described correspondence table (S92).

If the result of the determination in step S92 is affirmative, the corresponding color information is selected (S93), and transmitter's information is printed in the header portion (S94).

If a subaddress is absent, black is selected as a print color (S95), and transmitter's information is printed in the header portion (S94).

Figure 24:
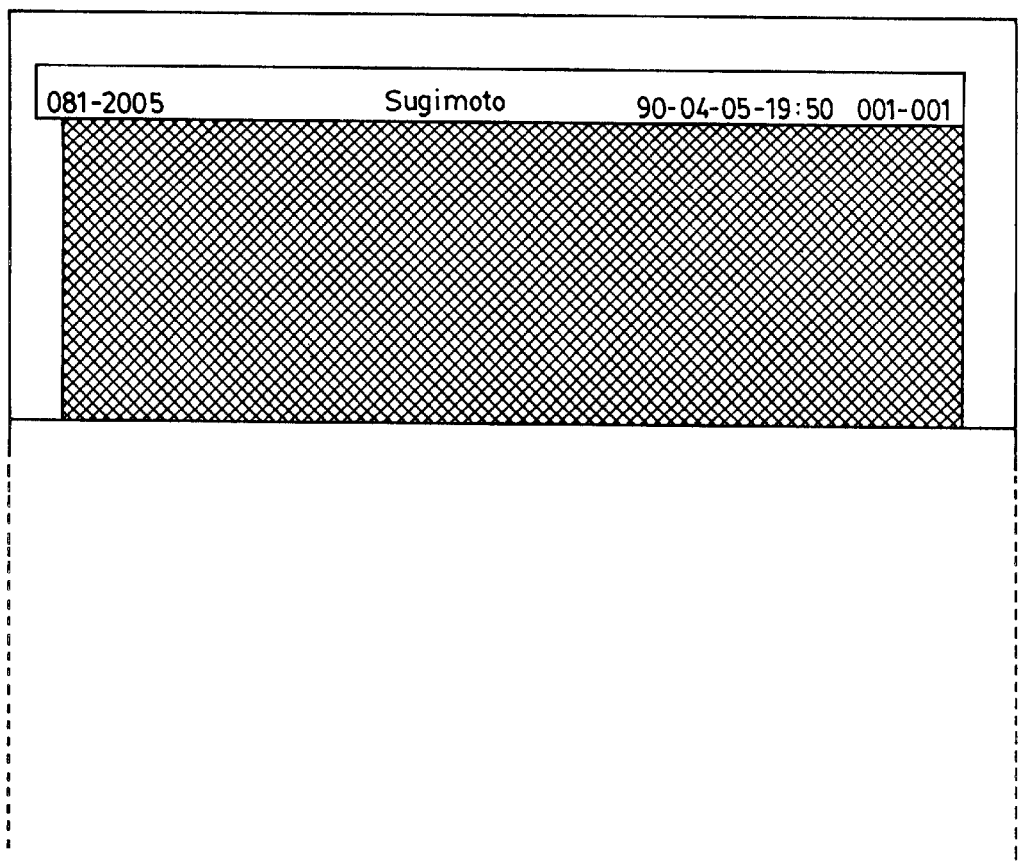
FIG. 24 is a schematic diagram illustrating output paper in the third embodiment.

FIG. 24 is a schematic diagram showing an example of output paper.

In this example, the transmitter's name in alphabetical characters, the identifying number of the communication partner's terminal in numerals, the date and the like are printed as transmitter's information in the header portion on the first page of the output paper. This portion is printed, for example, in red. It is thereby possible to know from the print color to whom the document is by merely glancing the head of the output paper.

Although, in the above-described embodiment, an explanation has been provided so that the entire transmitter's information is subjected to color printing, part of the information may be subjected to color printing. Furthermore, in addition to transmitter's information, a predetermined mark and the like may be subjected to color printing on specific blank portions.

In addition, a printing color may be selected according to identifying information other than a subaddress.

According to the present embodiment, since specific printing is performed in a preset color according to identifying information in the received information, it is possible to easily determine to whom the received document is transmitted according to the color by glancing at the printed portion.

Figure 25:
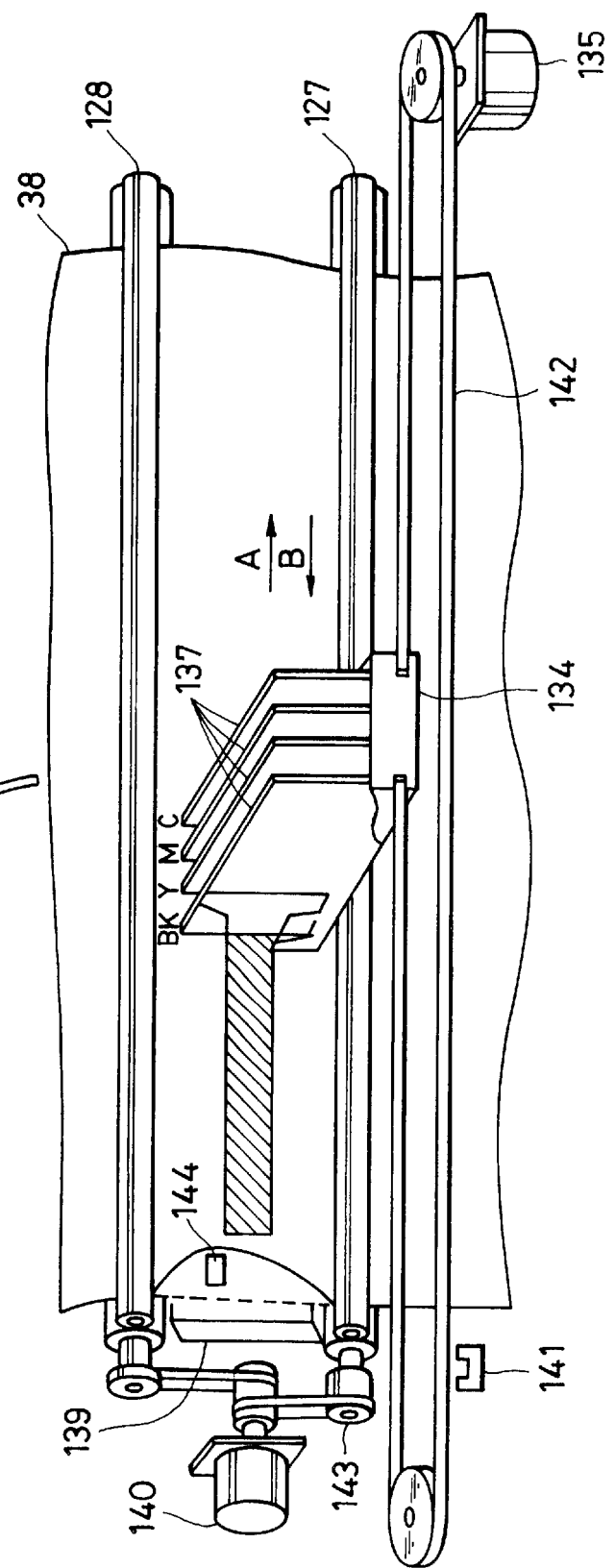
FIG. 25 is a perspective view of a color ink-jet printer to which the present invention may be applied.

FIG. 25 illustrates a color ink-jet printer suitable for the present invention. The operation of the printer will now be explained. Since heads 137 for respective colors are arranged substantially in the same position with respect to the subscanning direction, it is possible to perform single-color recording and four-color recording substantially in the same time period.

In FIG. 25, a sheet feed motor 140 functions as a driving source for intermittently feeding a recording sheet and drives a second sheet feed roller 127 through a sheet feed roller 128 and a second sheet feed roller clutch 143.

A scanning motor 135 is a driving source for scanningly moving the scanning carriage 134 through a scanner belt 142 in the directions A and B indicated by arrows. In this embodiment, in order to assure a correct sheet feed control, a pulse motor is used for the sheet feed motor 140 and the scanning motor 135.

When the recording sheet reaches the second sheet feed roller 127, the second sheet feed roller clutch 143 and the sheet feed motor 140 are actuated to convey the recording sheet to the sheet feed roller 128 on a platen 139.

The recording sheet is detected by a sheet detecting sensor 144 provided on the platen 139, and the output thereof is used for position control and jam clearance control.

When the recording sheet reaches the sheet feed roller 128, the second sheet feed roller clutch 143 and the sheet feed motor 140 are deactuated, and a sucking operation is actuated from an inside of the platen 139 by an unshown sucking motor, by which the recording sheet is closely contacted to the platen 139.

Prior to an image recording operation on the recording sheet, the scanning carriage 134 is moved to the position of a home position sensor 141, and then, a scanning operation is started in the direction A. From a predetermined position, cyan, magenta, yellow and black ink materials are ejected from the recording heads 137 to effect the image recording. Upon completion of the image recording over a predetermined length, the scanning carriage 134 is stopped, and is moved in the backward direction (arrow B) to return the scanning carriage 134 to the position of the home position sensor 141. During the backward movement, the sheet feed motor 140 drives the sheet feed roller 128 to feed the sheet through a distance corresponding to the record by the recording head 137, in the direction C.

In this embodiment, the recording head 137 is in the form of an ink jet nozzle pipe wherein a bubble is produced by heat, and a pressure resulting therefrom is used to eject a droplet of ink. Each of the four recording heads has an array of 256 nozzles.

When the scanning carriage 134 is stopped at the home position where the home position sensor 141 detects the carriage 134, a recovery operation for the recording head 137 is effected. The recovery operation is carried out to stabilize the recording operation. More particularly, in order to prevent non-uniformity of the image attributable to the variation of the ink viscosity in the nozzles of the recording head 137, a pressurizing operation or ink idle ejecting operation of the recording head 134 is carried out in accordance with programmed conditions on the basis of sheet feed period, ambient temperature and ejection period or the like.

By repeating the above-operations, the recording operation is effected on the entire surface of the recording sheet.

The present invention is particularly suitably usable in a bubble jet recording head and recording apparatus .developed by Canon Inc. This is because, the high density of the picture element, and the high resolution of the recording are possible.

The typical structure and the operational principle are preferably such as disclosed in U.S. Pat. Nos. 4,723,129 and 4,740,796. The principle is applicable to a so-called on-demand type recording system and a continuous type recording system. However, it is particularly suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the themal energy is provided by the electrothermal transducer to produce film boiling on the heating portion of the recording head, whereby a bubble can be formed in the liquid (ink) corresponding to each of the driving signals. By the development and collapse of the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing the pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head or a plurality of recording heads combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of recovery means and auxiliary means for a preliminary operation are preferable, because they can further stabilize the effect of the present invention. As for such means, there are capping means for the recording head, cleaning means therefor, pressing or sucking means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single corresponding to a single color ink, or may be plural corresponding to a plurality of ink materials having different recording color or density. The present invention is effectively applicable to an apparatus having at least one of a monochromatic mode mainly with black and a multi-color with different color ink materials and a full-color mode by the mixture of the colors which may be an integrally formed recording unit or a combination of plural recording heads.

The present invention may be applied not only to color facsimile apparatuses, but also to all color terminals capable of communicating color data.

As explained above, according to the present invention, a color printing function may be used not merely for printing received color images, but may be effectively utilized. Furthermore, it is possible to grasp a communication status at a glance, and to perform communication control and control of received documents by the user in a simpler manner.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A communication apparatus comprising:

communication means for communicating an image;

generating means for generating communication status information relative to image communication by said communication means, said communication status information being comprised by a plurality of items; and output means for visually outputting said image communicated by said communication means, and for visually outputting said plurality of items by using a respectively different color for each different type of item, wherein said output means outputs said plurality of items so that an operator can visually discriminate between said plurality of items when viewing said plurality of items at the same time.

2. A color communication apparatus according to claim 1, wherein said plurality of items include an item representing whether a communication error exists during said communication.

3. A color communication apparatus according to claim 2, wherein said output means changes an output color of said item representing whether the communication error exists during said communication in accordance with existence or non-existence of said communication error.

4. A color communication apparatus according to claim 1, wherein said plurality of items includes an item representing a communication time during said communication.

5. A color communication apparatus according to claim 4, wherein said output means changes an output color of said item representing the communication time during said communication in accordance with said communication time.

6. A color communication apparatus according to claim 1, wherein said plurality of items include an item representing whether said communication is transmission or reception.

7. A color communication apparatus according to claim 6, wherein said output means changes an output color of said item representing whether said communication is transmission or reception in accordance with transmission or reception.

8. A color communication apparatus according to claim 1, wherein said plurality of items include an item representing whether said communication is memory-reception or direct-reception.

9. A color communication apparatus according to claim 8, wherein said output means changes an output color of said item representing whether said communication is memory-reception or direct reception in accordance with memory-reception or direct-reception.

10. A color communication apparatus according to claim 1, wherein said plurality of items include an item representing whether said communication is local communication or long-distance communication.

11. A color communication apparatus according to claim 10, wherein said output means changes an output color of said item representing whether said communication is local communication or long-distance communication in accordance with local communication or long-distance communication.

12. A color communication apparatus according to claim 1, wherein said plurality of items include an item representing a communication fee during said communication.

13. A color communication apparatus according to claim 12, wherein said output means changes an output color of said item representing the communication fee during said communication in accordance with said communication fee.

14. A color communication apparatus according to claim 1, wherein said output means outputs said plurality of items and said color image on the same medium.

15. A color communication apparatus according to claim 1, wherein said output means comprises a color printer capable of recording a plurality of colors.

16. A color communication apparatus according to claim 15, wherein said color printer comprises a color ink-jet printer.

17. A color communication apparatus according to claim 16, wherein said color ink-jet printer includes respective heads for cyan, magenta, yellow and black.

18. A color communication apparatus comprising:

reception means for receiving confidential documents;

storage means for storing at least one confidential document received by said reception means in at least one confidential box;

color registration means for registering a different color for each confidential box of said storage means; and color output means for outputting a confidential document reception report using a color for a confidential box of said storage means registered in said color registration means.

19. A communication method comprising the steps of:

communicating an image;

generating communication status information relative to image communication in said communicating step, said communication status information being comprised by a plurality of items of at least one type; and visually outputting said image communicated in said communicating step, and visually outputting said plurality of items by using a respectively different color for each different type of item, wherein said output is performed so that an operator can visually discriminate between said plurality of items when viewing said plurality of items at the same time.

20. A color communication method according to claim 19, wherein said plurality of items include an item representing whether a communication error exists during said communication.

21. A color communication apparatus according to claim 20, wherein in said visually outputting step an output color of said item representing whether the communication error exists is changed during said communication in accordance with existence or non-existence of said communication error.

22. A color communication apparatus according to claim 19, wherein said plurality of items includes an item representing a communication time during said communication.

23. A color communication apparatus according to claim 22, wherein said in said visually outputting step an output color of said item representing the communication time during said communication is changed in accordance with said communication time.

24. A color communication apparatus according to claim 19, wherein said plurality of items include an item representing whether said communication is transmission or reception.

25. A color communication apparatus according to claim 24, wherein said in said visually outputting step an output color of said item representing whether said communication is transmission or reception is changed in accordance with transmission or reception.

26. A color communication apparatus according to claim 19, wherein said plurality of items include an item representing whether said communication is memory-reception or direct-reception.

27. A color communication apparatus according to claim 26, wherein in said visually outputting step an output color of said item representing whether said communication is memory-reception or direct reception is changed in accordance with memory-reception or direct-reception.

28. A color communication apparatus according to claim 19, wherein said plurality of items include an item representing whether said communication is local communication or long-distance communication.

29. A color communication apparatus according to claim 28, wherein in said visually outputting step an output color of said item representing whether said communication is local communication or long-distance communication is changed in accordance with local communication or long-distance communication.

30. A color communication apparatus according to claim 19, wherein said plurality of items include an item representing a communication fee during said communication.

31. A color communication apparatus according to claim 30, wherein in said visually outputting step an output color of said item representing the communication fee during said-communication is changed in accordance with said communication fee.

32. A color communication apparatus according to claim 19, wherein in said visually outputting step said plurality of items and said color image are output on the same medium.

33. A communication apparatus comprising:
   communication means for communicating an image;
   generating means for generating communication status information relative to image communication by said communication means, said communication status information being comprised by a plurality of items of at least one type; and
   output means for visually outputting said image communicated by said communication means, and for visually outputting said plurality of items;
   wherein one type of said plurality of items is output with one color and another type of said plurality of items is output with another color, and
   wherein said output means outputs said one type of said plurality of items and said another type of said plurality of items so that an operator can visually discriminate therebetween when viewing said one type of said plurality of items and said another type of said plurality of items at the same time.

34. A communication apparatus according to claim 33, wherein said color output means comprises a color printer capable of recording a plurality of colors.

35. A communication apparatus according to claim 34, wherein said color printer comprises a color ink-jet printer.

36. A communication apparatus according to claim 35, wherein said color ink-jet printer includes respective heads for cyan, magenta, yellow and black.

37. A communication apparatus according to claim 33, wherein said plurality of items including an item representing whether a communication error exists during said communication.

38. A communication apparatus according to claim 37, wherein said output means changes an output color of said item representing whether the communication error exists during said communication in accordance with existence or non-existence of said communication error.

39. A communication apparatus according to claim 33, wherein said plurality of items includes an item representing a communication time during said communication.

40. A communication apparatus according to claim 39, wherein said output means changes an output color of said item representing the communication time during said communication in accordance with said communication time.

41. A communication apparatus according to claim 33, wherein said plurality of items include an item representing whether said communication is transmission or reception.

42. A communication apparatus according to claim 41, wherein said output means changes an output color of said item representing whether said communication is transmission or reception in accordance with transmission or reception.

43. A communication apparatus according to claim 33, wherein said plurality of items include an item representing whether said communication is memory-reception or direct-reception.

44. A communication apparatus according to claim 43, wherein said output means changes an output color of said item representing whether said communication is memory-reception or direct reception in accordance with memory-reception or direct-reception.

45. A communication apparatus according to claim 33, wherein said plurality of items include an item representing whether said communication is local communication or long-distance communication.

46. A communication apparatus according to claim 45, wherein output means changes an output color of said item representing whether said communication is local communication or long-distance communication in accordance with local communication or long-distance communication.

47. A communication apparatus according to claim 33, wherein said plurality of items include an item representing a communication fee during said communication.

48. A communication apparatus according to claim 47, wherein said output means changes an output color of said item representing the communication fee during said communication in accordance with said communication fee.

49. A communication apparatus according to claim 33, wherein said output means outputs said plurality of items and said color image on the same medium.

50. A color communication apparatus comprising:
   reception means for receiving confidential documents from different communicators;
   storage means for storing received confidential documents so as to distinguish one communicator of confidential documents from another communicator of said confidential documents; and
   color output means for outputting confidential document reception information by using an output color predetermined for each communicator of said confidential documents.

51. A communication method comprising the steps of:
   communicating an image;
   generating communication status information relative to image communication communicated in said communicating step, sid communication status information being comprised by a plurality of items of at least one type; and
   visually outputting said image communicated in said communicating step, and for visually outputting said plurality of items;
   wherein one type of said plurality of items is output with one color and another type of said plurality of items is output with another color, and
   wherein said output step outputs said one type of said plurality of items and said another type of said plurality of items so that an operator can visually discriminate therebetween when viewing said one type of said plurality of items and said another type of said plurality of items at the same time.

52. A communication method according to claim 51, wherein said output step comprises outputting by a color printer capable of recording a plurality of colors.

53. A communication method according to claim 52, wherein said color printer comprises a color ink-jet printer.

54. A communication method according to claim 53, wherein said color ink-jet printer includes respective heads for cyan, magenta, yellow and black.

55. A communication method according to claim 51, wherein said plurality of items include an item representing whether a communication error exists during said communication.

56. A communication method according to claim 55, wherein an output color of said item representing whether the communication error exists during said communication is changed in accordance with existence or non-existence of said communication error.

57. A communication method according to claim 51, wherein said plurality of items includes an item representing a communication time during said communication.

58. A communication method according to claim 57, wherein an output color of said item representing the communication time during said communication is changed in accordance with said communication time.

59. A communication method according to claim 51, wherein said plurality of items include an item representing whether said communication is transmission or reception.

60. A communication method according to claim 59, wherein an output color of said item representing whether said communication is transmission or reception is changed in accordance with transmission or reception.

61. A communication method according to claim 51, wherein said plurality of items include an item representing whether said communication is memory-reception or direct-reception.

62. A communication method according to claim 61, wherein an output color of said item representing whether said communication is memory-reception or direct reception is changed in accordance with memory-reception or direct-reception.

63. A communication method according to claim 51, wherein said plurality of items include an item representing whether said communication is local communication or long-distance communication.

64. A communication method according to claim 63, wherein an output color of said item representing whether said communication is local communication or long-distance communication is changed in accordance with local communication or long-distance communication.

65. A communication method according to claim 51, wherein said plurality of items include an item representing a communication fee during said communication.

66. A communication method according to claim 65, wherein an output color of said item representing the communication fee during said communication is changed in accordance with said communication fee.

67. A communication method according to claim 51, wherein said plurality of items and said color image is output on the same medium.

\* \* \* \* \*

UNITED STATES PATENT AND TRADEMARK OFFICE
CERTIFICATE OF CORRECTION

PATENT NO. : 6,359,707 B1
DATED : March 19, 2002
INVENTOR(S) : Yoshihisa Tadokoro et al.

It is certified that error appears in the above-identified patent and that said Letters Patent is hereby corrected as shown below:

Column 1,
Line 57, "as" should read -- has --.

Column 2,
Line 41, "a at received" should read -- a received --.

Column 3,
Line 16, "FIG 1," should read -- FIG. 1 --.

Column 7,
Line 2, "S46" should read -- S45 --.

Column 8,
Line 28, "pass words" should read -- passwords --; and
Line 36, "pass words" should read -- passwords --.

Column 13,
Line 35, ".devel-" should read -- devel- --.

Column 15,
Line 12, "wberein" should read -- wherein --.

Column 16,
Line 49, "said in said" should read -- in said --; and
Line 58, "said in said" should read -- in said --.

UNITED STATES PATENT AND TRADEMARK OFFICE
CERTIFICATE OF CORRECTION

PATENT NO.    : 6,359,707 B1
DATED         : March 19, 2002
INVENTOR(S)   : Yoshihisa Tadokoro et al.

It is certified that error appears in the above-identified patent and that said Letters Patent is hereby corrected as shown below:

<u>Column 17,</u>
Line 19, "said-communication" should read -- said communication --.

<u>Column 18,</u>
Line 23, "wherein output" should read -- wherein said output --.

Signed and Sealed this

Fourth Day of March, 2003

JAMES E. ROGAN
*Director of the United States Patent and Trademark Office*